July 4, 1939.    H. P. BOSWAU    2,164,379
SUPERVISORY CONTROL SYSTEM
Filed June 7, 1934    6 Sheets-Sheet 2

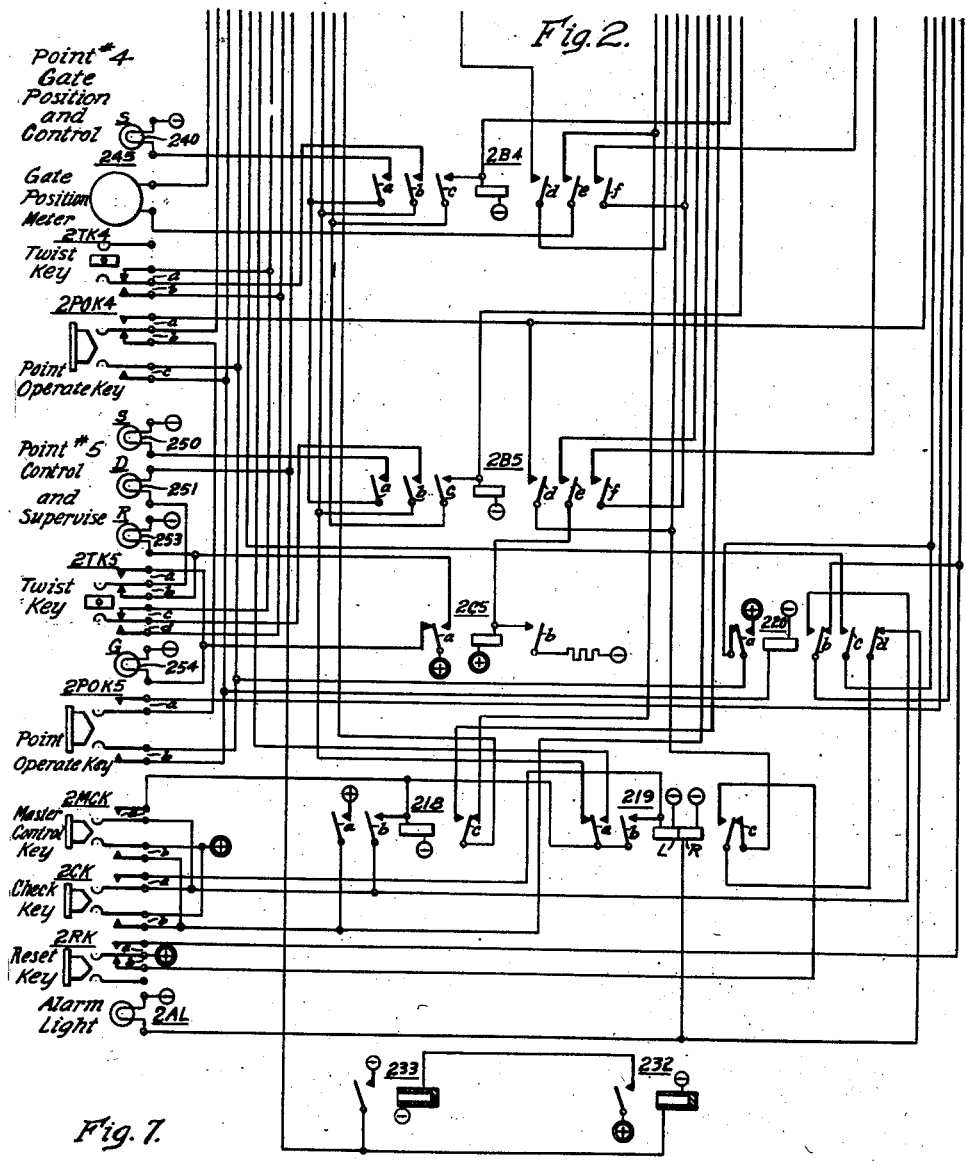

Fig. 2.

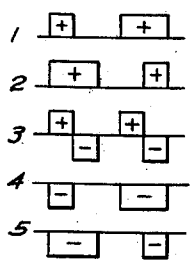

Code and Operation after point is selected and checked.

[+] Check breaker position
Switch from full scale to actual meter reading.
Stop "Raise" or "Lower" operation
Supervision for breaker "Closed."

[+] Trips breaker
Initiates "Lower" operation.

[+] Closes breaker
Initiates "Raise" operation.

[−] Supervision for breaker "Tripped"

[+] Releases set to normal.

INVENTOR
Hans P. Boswau.
BY
ATTORNEY

July 4, 1939.                H. P. BOSWAU                2,164,379
                      SUPERVISORY CONTROL SYSTEM
                   Filed June 7, 1934        6 Sheets-Sheet 4

WITNESSES:                              INVENTOR
                                     Hans P. Boswau.
                                          BY
                                              ATTORNEY Patented July 4, 1939

2,164,379

UNITED STATES PATENT OFFICE 2,164,379

SUPERVISORY CONTROL SYSTEM

Hans P. Boswau, Galion, Ohio

Application June 7, 1934, Serial No. 729,456

19 Claims. (Cl. 177—353)

My invention relates generally to electrical control systems and it has particular relation to supervisory control systems.

It has been the practice in the past to provide supervisory control systems which are arranged to operate over a single pair of conductors and which are so designed as to provide for the operation of a relatively large number of points of control. In the systems of the prior art which have been developed on this basis, it has been necessary to provide a large number of relays serving as the common equipment in view of the large number of points which it may be desirable to control. Such a system is shown in Patent No. 1,714,966 to Wensley et al. Ordinarily, the common equipment is not dependent upon the number of points which are controlled since the same common equipment is required whether five or fifty points are to be controlled. These systems are not only complicated but also they are expensive in the first cost, and further are expensive to maintain. It is, therefore, desirable to reduce the number of relays or other apparatus to a minimum in order to reduce the first cost and to decrease the operating expense to a minimum.

In many instances, it is desired to control only a relatively small number of points at a sub-station from a main station or office. Therefore, I have provided a supervisory control system which may be employed for controlling the operation of a limited number of points, such as five, and I have specifically designed the apparatus and circuits with a view to reducing the amount of equipment required to a minimum. In view of the fact that it is not intended to control a large number of points the common equipment may be reduced to a minimum with the corresponding reduction in first cost and expense of operation.

The object of my invention, generally stated, is to provide a supervisory control system which shall be simple and efficient in operation, and which may be readily and economically manufactured and installed.

The principal object of my invention is to provide for controlling a plurality of conditions from a remote point.

An important object of my invention is to provide for transmitting one of a plurality of impulses of different polarity and length to a remote station over a single signalling circuit in order to select at the remote station a point individual to the impulse.

Another important object of my invention is to provide for transmitting from a main station or office one of a plurality of selection impulses of different polarity and length to a remote station or sub-station over a single signalling circuit, in order to select at the remote station an operating point individual to the impulse, and for transmitting from the remote station to the main station a check impulse individual to the point selected to check the selection.

Still another important object of my invention is to provide for applying to the signalling circuit a timed operation impulse in order to effect a predetermined operation individual to the impulse at the selected point.

Another object of my invention is to provide for comparing a voltage at the remote station with a voltage indicating the state of a variable condition at the remote station in order to provide an accurate indication at the main station of the state of the condition at the remote station.

Still another object of my invention is to provide for simultaneously effecting a change in a condition at the remote station and indicating the change as it takes place at the main station.

A still further object of my invention is to provide for arresting further change in the condition and automatically indicating at the main station the state of the variable condition at the termination of the change.

Other objects of my invention will, in part, be obvious and, in part, appear hereinafter.

My invention accordingly is disclosed in the embodiment hereof shown in the accompanying drawings, and comprises the features of construction, combination of elements, and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figures 1, 2 and 3 illustrate diagrammatically the circuit connections and apparatus which are provided at the office or main station;

Fig. 7 illustrates graphically the impulse codes which are provided for selecting and checking the points of this supervisory control system; and, Fig. 8 illustrates graphically the codes which are employed for performing certain operations after a point has been selected and checked.

General description

Figure 1:
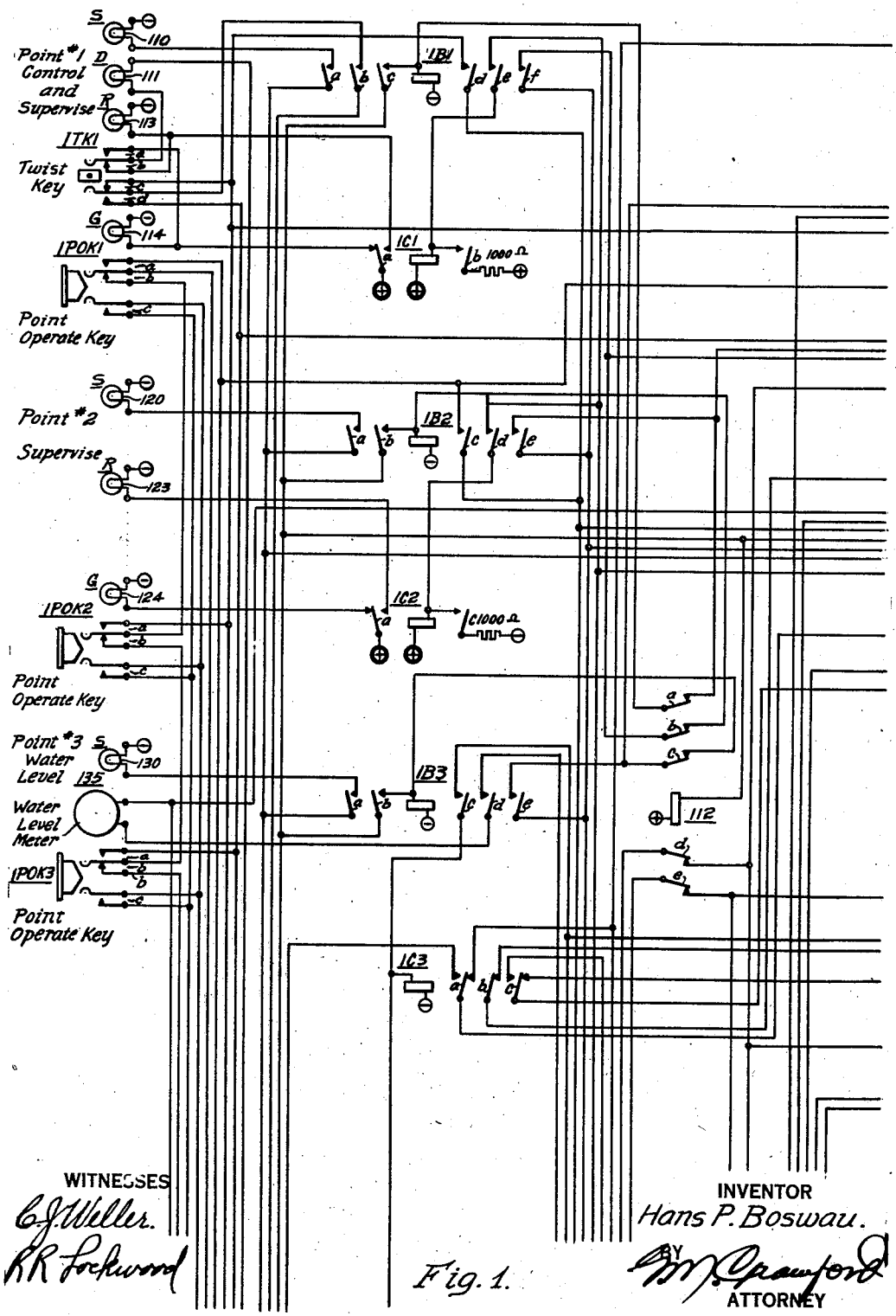

In order to fully set forth the functioning of my new supervisory control system, it will be described in connection with the remote control of a hydro-electric power plant from a central or main station or office. It will be understood, however, that this description is merely illustrative and that the invention could be practiced for the control of various other types of equipment and for the obtaining of indications of variable conditions and initiating changes therein other than those illustrated and described herein.

According to this invention, I have provided for controlling five points at the sub-station and I have provided five corresponding control points at the office. Points Nos. 1 and 5 at the substation are associated with main line feeder circuit breakers. The circuit breakers are provided with closing and tripping mechanisms which may be controlled from the corresponding control points at the office. In addition, it is also possible to supervise the condition of the circuit breakers individual to points 1 and 5 and, accordingly, supervisory control signals are provided at the office by means of the customary red and green indicating lights to indicate whether the circuit breaker is in the closed or tripped position.

In the event that a fault occurs at the sub-station, such as a short circuit on the generator or some other like occurrence which would cause the station to be locked out, it is desirable to have an indication of the position of the main circuit breaker at the office. However, it is undesirable to provide for controlling the main circuit breaker from the office in view of the fact that it is not automatically tripped unless some serious fault occurs at the sub-station, which necessitates an investigation before the circuit breaker should be reclosed. Therefore, point No. 2 is provided at the sub-station, which is arranged to provide only an indication of the condition of the main circuit breaker at the corresponding control point No. 2 at the office.

The load which the generator at the hydro-electric station can carry depends to a large extent upon the head of water which is available for operating the water turbine. It is, therefore, desirable to provide at the office some means for giving an indication of the water level in order that the operator can determine whether or not the particular hydro-station is properly loaded. For this purpose, No. 3 point at the sub-station is provided, which is arranged to transmit to the corresponding No. 3 point at the office, an indication of the water level.

The load on the generator may be varied by increasing or decreasing the amount of water which is permitted to flow through the water turbine. In turn, the flow of water is regulated by means of a gate. It is desirable to provide at the office not only means for opening and closing the gate, but it is also desirable to provide means for indicating to the operator the position of the gate. It is further desirable to provide the operator with a continuous indication of the movement of the gate simultaneously with its movement so that further movement may be arrested as soon as, in the judgment of the operator, the gate has been opened to the desired extent. Points No. 4 at the office and sub-station are provided for effecting these functions. By means of apparatus associated with these points, it is possible not only to raise and lower or to open and close the gate, but it is also possible to obtain a continuous indication of the change in position of the gate simultaneously with the change taking place thereat.

Although the supervisory control system has been illustrated and described herein in connection with certain types of apparatus units individual to each of the points at the sub-station, it will be understood that other combinations of apparatus units may be used. Thus it may be desirable to provide all five of the points for controlling and supervising the operation of circuit breakers. In another instance it may be desirable to provide for supervising the operation of one or more circuit breakers. In still another instance, it may be desirable to obtain indications of the levels of liquids or the pressure of gas or the like and to open or close valves or to perform other functions. It will, therefore, be understood that the particular apparatus units associated with the points at the sub-station illustrated and described herein are used for illustrative purposes only.

In order to select any one of the five points at the sub-station different impulses are employed, each of which is individual to a particular point. In addition, when it is desired to select a point at the office due to an operation at the substation, the same code impulse is transmitted. In order to check the selection an impulse individual to the point selected is transmitted to the station originating the selection impulse. In the embodiment of the invention described herein, only points 1, 2 and 5 at the sub-station are arranged to originate selection impulses, while at the office each of the five points is arranged to select a corresponding point at the sub-station.

By the term "impulse" I mean the application of a positive or negative voltage to a circuit comprising two conductors. Thus, considering a circuit comprising conductors L1 and L2, which are provided as illustrated herein for connecting the office with the sub-station, a positive impulse is applied to the circuit when the positive terminal of the battery at the office is connected to conductor L1 and the negative terminal of the battery is connected to the conductor L2. Similarly, when the negative terminal of the battery is connected to the conductor L1 and the positive terminal of the battery is connected to the conductor L2, a negative impulse is applied to the line. It will, therefore, be understood that when in the specification and claims the term "positive impulse" is mentioned, the term means that conductor L1 is connected to the positive terminal of the battery at the office, or the sub-station, and that the conductor L2 is connected to the negative terminal of the battery at the office or at the sub-station. Likewise, when the term "negative impulse" is used it will be understood that the conductor L1 is connected to the negative terminal of the battery at either the office or the sub-station and that the conductor L2 is connected to the positive terminal of the battery at either the office or the sub-station.

In order to select any one of the five points at the sub-station an impulse individual to that point is applied to the line connecting the stations. As illustrated in Fig. 7 of the drawings, a short positive impulse is applied for selecting point No. 1, while a short negative impulse is provided for selecting point No. 4. In order to select point No. 2 a positive impulse of longer duration than the short impulse is provided and this is termed a long positive impulse. Similarly, point No. 5 is selected by applying to the line a negative impulse which is longer than the short negative impulse and this will be termed a long negative impulse. Point No. 3 is selected by applying to the circuit a short positive impulse followed immediately by a short negative impulse. From the foregoing it will be observed that a timed impulse individual to each point may be transmitted from the office to the sub-station in order to select a point at the latter corresponding to the impulse which is individual thereto.

After a point at the sub-station has been selected it is desirable to have the point selected originate a check impulse, which will cause an indication to be given to the operator that the point which has been selected is the point which he has desired to select. Therefore, as soon as any particular point has been selected, a check impulse is transmitted to the station originating the selection impulse. As illustrated in Fig. 7, a check impulse is provided for each point which is individual to that particular point. Thus, when point No. 1 or point No. 4 has been selected a long positive impulse or a long negative impulse respectively, will be transmitted back to the station making the selection to indicate to the operator that the correct selection has been made. Short positive and negative impulses are provided, respectively, for checking points Nos. 2 and 5. It will be observed that point 3 is checked by means of the short positive impulse followed immediately by the short negative impulse. The combination of selection and check impulses has been so chosen as to provide approximately the same length of time for each point to complete the selection and check operation.

After a point has been selected an operation impulse is transmitted to the selected point in order to effect an operation at that point which is individual to the operation impulse that is transmitted. While it will be understood that only points 1, 2 and 5 may originate selection impulses, the following description will generally be based upon the selection impulses originating at the office, although it will be understood that selection impulses may be originated at these points at the sub-station.

Referring particularly to Fig. 8, it will be observed that the position of the circuit breaker at points 1, 2 and 5 is checked by transmitting a short positive impulse. In like manner, this same impulse is applied to either points 3 or 4 for switching from the full scale to the actual meter reading for a purpose which will be set forth hereinafter. Also, the short positive impulse may be applied to stop further operation of the gate operating mechanism which is associated with point No. 4. After the circuit breaker at points 1, 2 and 5 has been closed a short positive impulse will be applied to the line in order to indicate this fact to the operator.

When it is desired to trip either of the circuit breakers associated with points 1 or 5, a long positive impulse is applied to the line or signalling circuit. This same impulse is also applied to the signalling circuit when point No. 4 has been selected and it is desired to close the gate.

In order to close the circuit breakers associated with points Nos. 1 and 5, or to initiate the opening of the gate associated with point No. 4, the sequence of short positive and negative impulses is transmitted.

When any of the circuit breakers associated with points 1, 2 and 5 are tripped either intentionally or automatically at the sub-station, a short negative impulse is applied to the signalling circuit to indicate that a circuit breaker has been tripped. This impulse, of course, will be applied only after the corresponding points have been selected, which points correspond to the circuit breaker, the position of which has changed, thereby originating the short negative impulse.

After the operator has completed any desired sequence of operations or in the event that the system should become inoperative due to faulty functioning of certain of the relays, the entire system may be released to normal by the application of an extra long positive impulse to the signalling circuit.

*Description of scheme of operation*

With a view to setting forth the fundamental scheme of operation of my invention, a short description thereof will be given. The following detailed description will then be more readily understandable and it will not then be necessary to again set forth the reason for certain operations taking place.

Each of the stations is provided with a pair of oppositely connected polarized relays which are adapted to be connected to the signalling circuit connecting the stations. One or the other of the polarized relays is adapted to be pulled on the application of the impulse for which it is adapted to be pulled. Thus, on the application of a positive impulse to the signalling circuit, the positive line polarized relays will be pulled. In like manner on the application of a negative impulse to the signalling circuit, the negative line polarized relays are pulled.

Throughout the specification and claims the terms "pulled" and "dropped" are employed in order to designate respectively that a relay has been energized or deenergized. It is thought that these terms are somewhat more descriptive of the functioning of the relays when they are energized or deenergized, and therefore, these terms will be used with this meaning.

Each station is also provided with a positive and a negative sending relay. It will be understood that the positive sending relay is arranged to apply a positive impulse to the signalling circuit while the negative sending relay is arranged to apply a negative impulse to the signalling circuit.

A positive receiving relay and a negative receiving relay are provided at each station, and are adapted to be pulled on the application to the signalling circuit of either a positive or a negative impulse.

When a short positive or negative impulse is applied to the signalling circuit, the corresponding line relays at both stations will be pulled, thereby causing the pulling of either the positive or the negative receiving relay at both stations, depending upon whether a positive or a negative impulse has been sent. The pulling of the line relays at the station originating the impulse opens the pulling circuit to the corresponding transmitting relays, and after the expiration of a predetermined short interval they drop. During this interval, certain circuits are completed which cause the simultaneous selection of point selection relays at the office and the sub-station. After the point selection relays have been pulled, no further selection can take place, due to the fact that a selection cut-off relay is pulled. The foregoing described selection will take place in connection with the selection of either points Nos. 1 and 4.

As set forth hereinbefore, in order to select points 2 and 5 long positive or negative impulses are applied to the signalling circuit. These impulses are applied by arranging to pull the positive and negative sending relays for a time much longer than that during which they are pulled for transmitting the short positive and negative impulses. The positive and negative sending relays are held pulled for the extra long time by the provision of a long impulse sending relay which is arranged to drop out only after the expiration of an extra long time. The pulling circuits for the positive and negative sending relays are controlled by the long impulse sending relay and, therefore, they are not dropped until a predetermined time after the long impulse sending relay has been dropped. It is during this interval that certain circuits are completed individual to points 2 and 5 which effect the pulling of the corresponding point selection relays.

In order to select point 3 both the positive and the negative sending relays are simultaneously pulled. However, the positive sending relay is arranged to first pull the positive line relays at both stations. As soon as the positive line relays are pulled the circuit to the positive sending relay is opened and after the expiration of a predetermined interval, it drops. A circuit is then completed immediately for pulling the negative line relay, and after the expiration of a predetermined interval, the negative sending relay drops. Thus, a short positive impulse is transmitted followed immediately by a short negative impulse. In response to the pulling of the positive and negative line relays the positive and negative receiving relays are both pulled. During the interval when both of these relays are pulled, circuit connections are completed for pulling the point selection relays individual to points 3 at the office and sub-station.

At the end of the transmission of an impulse from either station, sending control relays are provided for preventing the transmission of another impulse from the same station, and in addition, the sending control relays complete circuits in preparation to the receipt of a successive impulse from the station not originating the first impulse.

After any one of the five points has been selected at the sub-station, for instance, the check impulse individual to the point selected is transmitted to the office in a manner similar to that in which the selection impulse was transmitted from the office to the sub-station. Due to the fact that the point selection relay at the office individual to the point which it is desired to control has been pulled, the operator is informed by means of the illumination of a stop lamp, that the correct point at the sub-station has been selected, if such is the case.

After the proper selection and check of selection has been made, the operator may check the position of the apparatus unit at the sub-station by depressing a check key. If the operator has selected point No. 1 at the sub-station, a short positive impulse will be transmitted in order to check the position of the circuit breaker associated with this point. If the circuit breaker is in the closed position, a short positive impulse will be returned to the office, and if the red indicating light on point No. 1 is illuminated, no change will take place. However, if the green light is illuminated, it will be extinguished and the red light will be lighted. Had the circuit breaker associated with point No. 1 been in the open position, a short negative impulse would have been returned to the office indicating that the circuit breaker was tripped. If the red indicating light associated with point No. 1 at the office had been illuminated, it would have been extinguished and the green light would have been lighted to indicate to the operator that the circuit breaker was in the tripped position.

After the position of the apparatus unit has been checked, the operator may desire to change its position. He then operates the twist key individual to the point under control to the desired position, and depresses a master control key. Referring again to point No. 1 and assuming that it has been selected, and the operator has found that the circuit breaker associated therewith is in the open position, and he wishes to close it, the operation of the master control key causes the sequence of short positive and negative impulses to be applied to the signalling circuit to effect the closure of the circuit breaker. Had the circuit breaker been closed, and the operator desired to trip it, the depression of the master control key would effect the application of a long positive impulse to the signalling circuit to effect the desired operation.

When it is desired to obtain an indication of the position of the gate associated with point No. 4, the operator causes this point to be selected in the manner set forth hereinbefore. As soon as point No. 4 is selected, the gate position meter associated with point No. 4 at the office gives an indication which corresponds to the voltage of the battery at the sub-station. On operating the check key a short positive impulse is applied to the signalling circuit, which causes a change in circuit, so that the gate position meter is connected across a potentiometer at the sub-station. The potentiometer is connected across the sub-station battery and it is operated in accordance with the movement of the gate. Thus, at all times, the voltage across the potentiometer, or what may be termed as the potentiometer voltage, gives an indication of the position of the gate.

Since the position of the gate is a function not only of the potentiometer voltage, but is also a function of the battery voltage which may vary, it will be understood why the battery voltage at the sub-station is first measured. The gate position meter is provided with two scales, one of which is calibrated in percent of battery voltage and the other in terms of gate position. Thus, when the gate position meter is connected across the potentiometer voltage, the actual gate position may be obtained by dividing the position scale reading by the percent reading of the normal battery voltage.

The operator may now initiate a raising or lowering operation of the gate by actuating the twist key and master control key at point No. 4 to transmit either a "raise" or a "lower" impulse to the second station. The "raise" impulse is a short positive impulse followed by a short negative impulse. The "lower" impulse is a long positive impulse. The transmission of this impulse effects the operation of either the "raise" or the "lower" relay at the second station which in turn initiate the operation of the gate actuating mechanism (not shown). During this operation, the indicating meter and potentiometer have been disconnected from the signalling circuit but when the initiation of the raise or lower operation has been completed the meter and potentiometer are again reconnected and give a continuous indication of the change in gate position taking place.

The raising or lowering operation may be terminated by operating the check key to transmit a short positive impulse which effects the release of either the "raise" or "lower" relay as the case may be.

After a desired sequence of operations has been performed, and the operator desires to restore the set to the normal condition, the point operate key individual to the point which has been operated is released. As a result, circuits are completed for effecting the pulling of the positive sending relay for an extra long time. This operation releases all of the relays which had been pulled, due to the sequence of operations necessary to obtain the desired control and indication functions, and restores them to normal in a manner which will be set forth in detail hereinafter.

*Description of apparatus*

In order to more readily locate the relays, switches, twist keys, indicating lights and the like, a reference character has been applied to each, the first numeral of which indicates the sheet on which the element may be found. Insofar as possible, the next numeral indicates the point with which the particular element or piece of apparatus is associated. The contact members of the relays are identified from left to right and from top to bottom by small letters. In like manner, the contact members of the twist keys and point operate keys are identified from top to bottom. The letter indicating the contact members will be employed throughout the specification immediately after the reference character applicable to the relay, twist key or the like. Thus, the reference character 1B1c means the fourth set of contact members reading from left to right of the relay identified as 1B1, which appears on sheet 1 and which is associated with point No. 1.

*Point equipment at the office*

The five control points at the office are illustrated in Figs. 1 and 2 of the drawings. Each of the points is provided with a point selection relay which are identified as B relays. The point selection B relays are pulled in response to a selection of a point in order to provide for subsequent operations on the point selected.

Points 1, 2 and 5 are provided with point lamp relays which are termed C relays. The C relays are provided for controlling the energization of the red and green indicating lamps which are associated with each point. Points 3 and 4 are provided with a common meter switching relay 1C3 for transferring the indicating meters associated therewith to the signalling circuit.

In order to indicate that the proper selection has been made a stop lamp is provided individual to each point. These stop lamps are identified as follows for each of the five units respectively: 110, 120, 130, 240 and 250.

The desired operations at each point are controlled by means of twist keys which are applied only to points 1, 4 and 5 in view of the fact that in the system illustrated and described herein, only these points are employed to effect control functions at the sub-station. The twist keys for these points are identified as follows: 1TK1, 2TK4, and 3TK5.

In the event that the position of the twist keys associated with points 1 and 5 does not agree with the position of the apparatus, disagreement lights 111 and 251 will be lighted.

The operator is informed as to whether or not a circuit breaker at the sub-station associated with a particular point is in the opened or the closed position by means of the customary red and green indicating lamps. Since points 1, 2 and 5 are associated with circuit breakers, they alone are provided with the red and green indicating lamps. The red indicating lamps individual to each point are respectively as follows: 113, 123, 253. The green lamps individual to each point respectively are as follows: 114, 124 and 254.

When the operator desires to select a particular point for performing any of the operations individual thereto, he operates a point operate key individual to each point which holds until it is manually released. The point operate keys make and break certain circuits on operation which will be set forth in detail hereinafter. The point operate keys individual to each point respectively are as follows: 1POK1, 1POK2, 1POK3, 2POK4, 2POK5.

As has been set forth hereinbefore, points 3 and 4 are provided for obtaining the indication of the state of certain conditions at the point individual thereto at the sub-station. Point No. 3 in particular is provided for obtaining an indication of a water level and a water level meter 135 is provided for obtaining this indication. Point No. 4 is associated with the gate operating mechanism and a gate position meter 245 is provided for indicating the position of the gate. It will be understood that the meters 135 and 245 are of the ordinary direct-current volt-meter type. They are arranged to measure the voltage across a potentiometer which is a function of the condition, the state of which it is desired to have an indication.

After a point has been selected and checked and it is desired to perform an operation, the master control key 2MCK may be depressed. The master control key is of the non-holding type, so that as soon as the operator removes his finger from it, it is immediately restored to the normal position.

After a point has been selected and the selection has been checked, it may be desirable to check the position of the apparatus unit associated therewith in order to ascertain as to whether or not the indicating lamps individual thereto at the office correspond correctly with the position of the apparatus unit. For this purpose, a check key 2CK is provided. The check key is also of the non-holding type and it is immediately released as soon as operating pressure is removed therefrom.

In order to restore the set to the normal condition after a series of operations has been completed, or if the set for some reason refuses to function, it may be re-set by means of a reset key 2RK. This key is also of the non-holding type and it releases immediately upon the removal of operating pressure.

In the event that one of the circuit breakers at the sub-station automatically trips, an alarm is given by means of an alarm light 2AL which continues to be lighted until the reset key 2RK is operated to restore the set to the normal operating position.

It is desirable to provide the operator with an indication of the particular circuit breaker which has automatically tripped in order that he may quickly be informed as to the condition of the apparatus at the sub-station. For this purpose, disagreement lamp flicker relays 232 and 233 are provided which are arranged to alternately energize and deenergize the disagreement lamp associated with the point which, in turn, is associated with the circuit breaker that has tripped. The disagreement lamp flicker relays 232 and 233 are of the extra slow-to-deenergize or drop out type.

As soon as any one of the point operate keys is operated to select the point associated therewith a start relay 220 is pulled and remains pulled until the set is restored to normal. After a point has been selected an operation control relay 218 is pulled as soon as the master control key is operated, in order to insure the completion of the cycle of operations even if the master control key is immediately released.

A check control relay 219 is provided having two pulling windings which may be identified as 219L and 219R. The winding 219L is energized to pull the relay on the operation of the check key 2CK. The winding 219R is energized to pull the relay 219 and light the alarm lamp 2AL in the event that one of the circuit breakers at the sub-station should be automatically tripped.

After a point selection has been made, a selection cut-off relay 112 is pulled in order to insure that no further selections will be made until the point which has been selected is released, and the set is restored to normal.

Point equipment at sub-station

Figure 5:
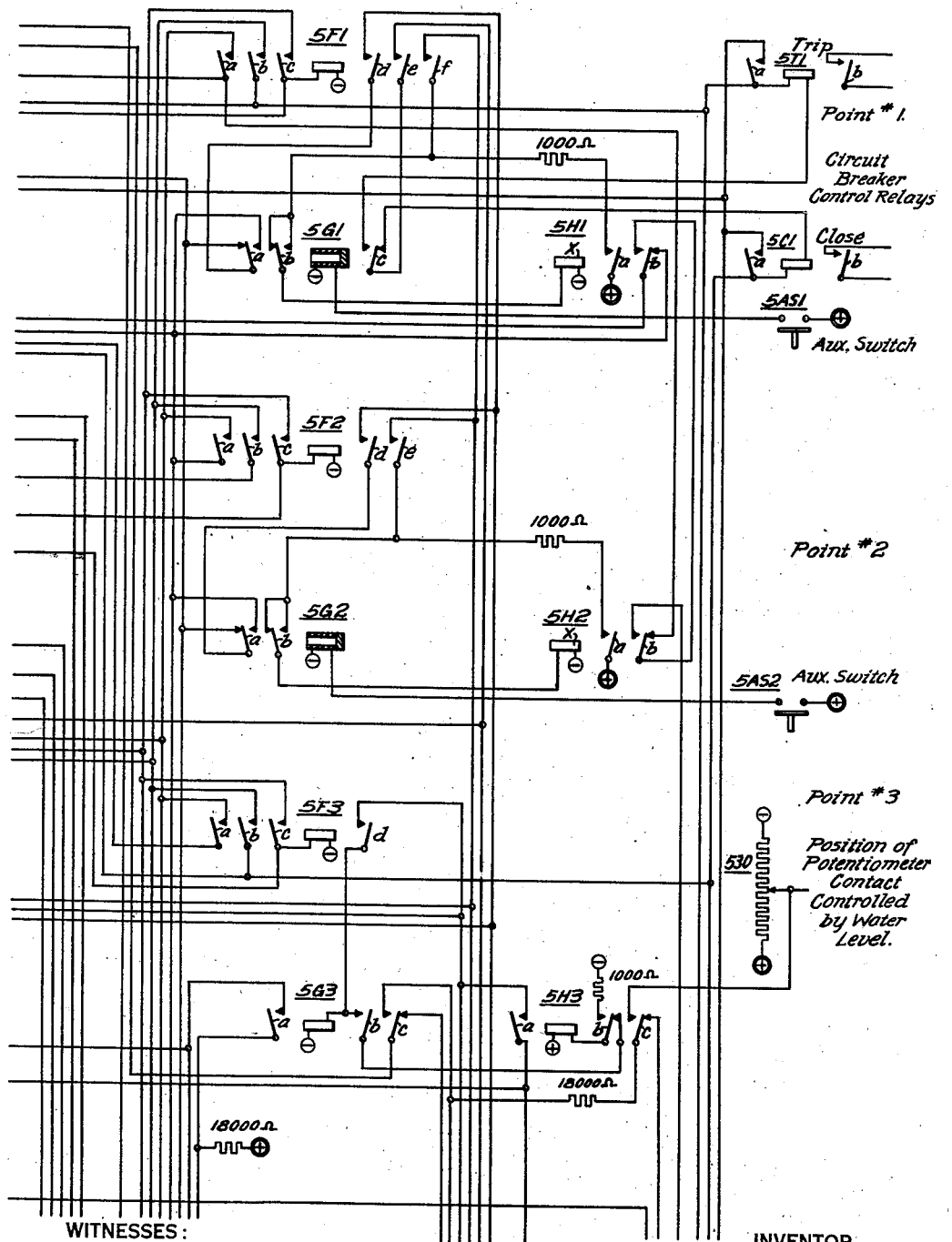
Figure 6:
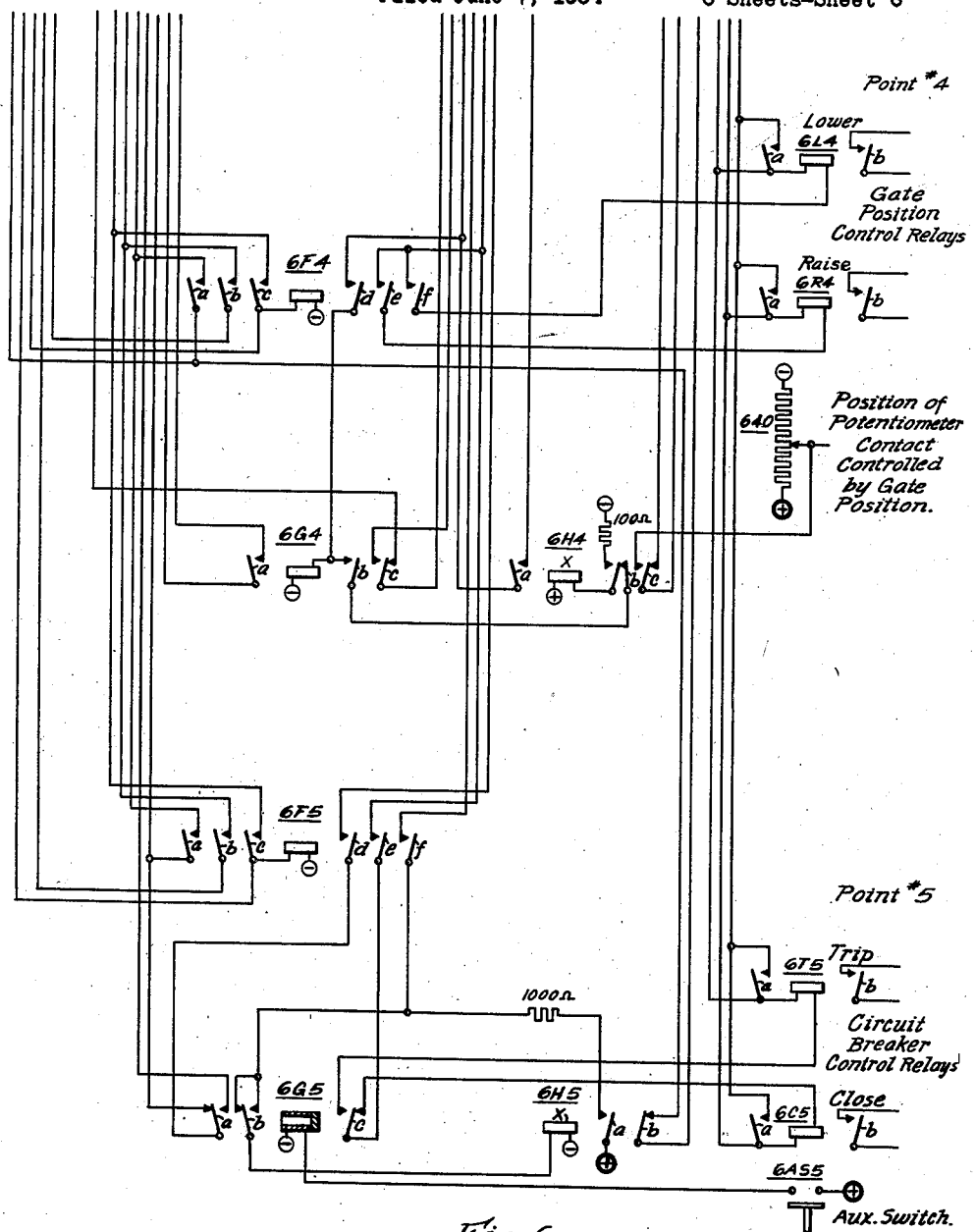

Referring now particularly to Figs. 5 and 6 of the drawings, it will be observed that the point equipment individual to each of the apparatus units at the sub-station is there shown. Point selection relays which may be termed F relays are provided, each of which is individual to a point. These relays are as follows: 5F1, 5F2, 5F3, 6F4 and 6F5.

A point supervision relay which may be termed a G relay is also associated with each point. These relays are as follows: 5G1, 5G2, 5G3, 6G4 and 6G5. It will be observed that point supervision relays 5G1, 5G2 and 6G5 are of the extra slow-to-deenergize or drop-out type.

Points 1, 2 and 5 are provided with point start relays which are normally pulled and which when dropped due to an operation at the sub-station, initiate the selection from any one of these points of the corresponding point at the office. These relays are as follows: 5H1, 5H2, and 6H5.

As has been set forth hereinbefore, it is desirable to obtain an indication of the voltage of the battery at the sub-station before measuring the potentiometer voltage which corresponds to the condition, the state of which it is desired to obtain. It is, therefore, desirable to provide for switching the meters associated with points 3 and 4 from measuring the battery voltage to measure the potentiometer voltage. For this purpose, indicator switching relays 5H3 and 6H4 are provided individual to points 3 and 4.

It will be recalled that points 1 and 5 are associated with circuit breakers and that it is intended that the circuit breaker associated with these points may be controlled from the office. For this purpose, trip relays 5T1 and 6T5 are provided. In order to close the circuit breakers, close relays 5C1 and 6C5 are provided. It will be observed that contact members associated with the trip and close relays are provided, which may be connected to a control circuit for effecting the desired functioning of the circuit breaker. Since these circuits are old and well known, they will not be shown or described herein. Each of the circuit breakers associated with points 1 and 5 is provided with an auxiliary switch which may be identified as 5AS1 and 6AS5 respectively. The auxiliary switches are provided for controlling the pulling and dropping of the point supervision relays as will be set forth in detail hereinafter.

Since point No. 2 is a supervision point only, no close and trip relays are provided therewith. The circuit breaker, however, associated with point No. 2 is provided with an auxiliary switch 5AS2, which is arranged to control the functioning of point supervision relay 5G2.

As has been set forth hereinbefore, a potentiometer is provided, the functioning of which is arranged to correspond to the water level. Since point No. 3 is provided in order to obtain the water level indication, a potentiometer 530 is provided, the position of the movable contact of which may be controlled by the level of the water in any well-known manner. As illustrated, the potentiometer 530 is arranged to be connected across the sub-station battery. It will, therefore, be apparent that the voltage existing between the negative terminal of the potentiometer 530 and its movable contact is a function of the water level.

Point No. 4 is arranged to control and indicate the position of the gate, which in turn, controls the flow of water to the water turbine, which drives the generator at the sub-station. The position of the gate is indicated by means of a potentiometer 640, which is connected as illustrated, across the sub-station battery. The movable contact of the potentiometer 640 is arranged to be moved in accordance with the movement of the gate. Thus, the voltage existing between the negative terminal of the potentiometer 640 and its movable contact is a function of the gate position. In order to decrease the gate opening or to lower it, a lowering relay 6L4 is provided. In like manner, in order to open or raise the gate a raise relay 6R4 is provided. It will be observed that contact members are provided on the lower and raise relays for connection to the necessary circuit arrangement for effecting the desired control of the gate position. In view of the fact that any well known circuit connections may be used for effecting the raising and lowering of the gate, they will not be shown or described in this specification.

Common equipment at the office

Figure 3:
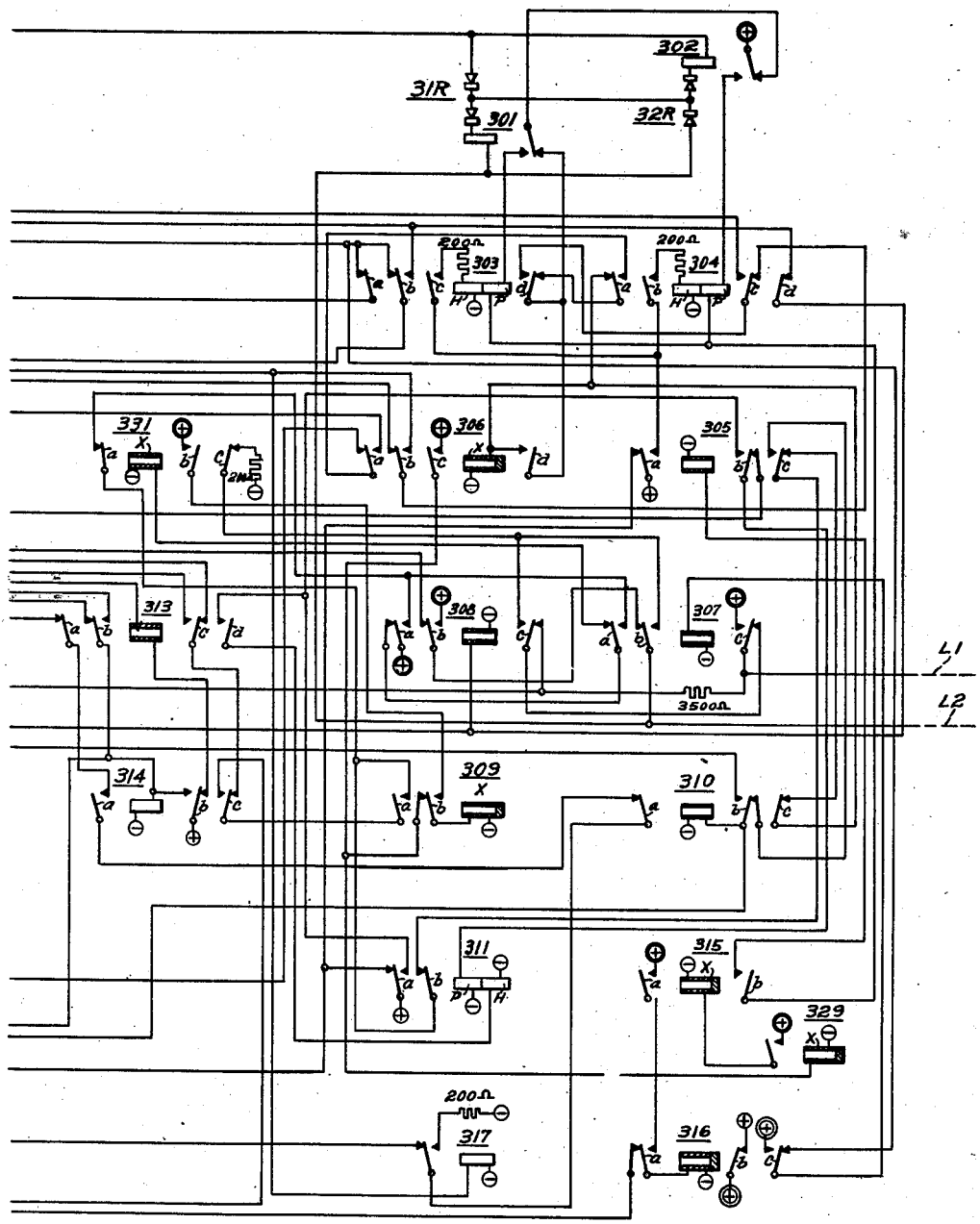

Referring particularly to Fig. 3 of the drawings, it will be observed that apparatus which is common to all of the points at the office is illustrated.

Positive and negative line relays 301 and 302 are provided and are arranged to be pulled on the application of either positive or negative impulses to the signalling circuit comprising the conductors L1 and L2. Associated with each of the line relays 301 and 302 is a rectifier of the dry-type, each of which may be designated as 31R and 32R, respectively. The combination of each relay and rectifier 301 and 31R, and 302 and 32R, form what is defined in the claims as "polarized relays". The combination of a standard relay and a dry type of rectifier is considerably less expensive than what are commonly termed "polarized relays" by the trade. However, their functioning is the same and it will be with this understanding that the term "polarized relay" is employed.

Positive and negative receiving relays 303 and 304 respectively are provided for receiving the correspondng impulses which are applied to the signalling circuit between the stations. Each of the receiving relays is provided with a pulling winding, which is identified by the letter P, and a holding winding which may be designated by the letter H. The two windings are provided in order to permit the receiving relays to remain pulled after the pulling circuit has been opened.

Associated with both of the receiving relays is a neutral receiving relay 305 which is of the slow-to-deenergize or drop-out type. The neutral receiving relay 305 controls the circuit to the holding windings of the receiving relays 303 and 304, so that they will remain pulled until the neutral receiving relay 305 drops.

When a long impulse either positive or negative is received, a long impulse receiving relay 306 is caused to drop. This relay is of the extra slow-to-deenergize or drop-out type, and will take considerably longer to drop out after its winding has been deenergized than what is known as the slow-to-deenergize type of relay.

The positive and negative impulses are applied to the signalling circuit by means of positive and negative sending relays 307 and 308, respectively. These relays are of the slow-to-deenergize or drop-out type. The contact members of the sending relays are so arranged as to apply either a positive or a negative impulse to the signalling circuit but are arranged in such manner that the two impulses cannot be applied simultaneously.

In order to send a long positive or negative impulse, a long impulse sending relay 309 is provided. It will be observed that relay 309 is of the extra slow-to-deenergize or drop-out type.

After an impulse has been transmitted from the office, a sending control relay 310 is pulled. This relay, in combination with a second sending control relay 311, is arranged to prevent the sending of a second impulse from the office after an impulse has once been sent and the combination of relays is arranged to condition the circuits for receiving the next impulse from the sub-station. It will be observed that the sending control relay 311 is provided with a pulling winding which may be designated by the letter P and a holding winding which may be designated by the letter H. The holding winding is provided for maintaining the relay 311 pulled under certain conditions when the pulling winding is not maintained energized.

After an impulse has been transmitted from the office to the sub-station, the circuits are transferred so that the check impulse may be received. This is accomplished by means of a switching relay 313, which is of the slow-to-deenergize or drop-out type.

After the selection has been checked, a check relay 314 is pulled and holds over its own front contacts to prepare circuits for subsequent operations on the point selected.

In order to release the set to normal after an operation has been performed, or for any other reason, a release relay 315 is provided in combination with an auxiliary release relay 329. The release relay 315 is arranged to control the operation of a release control relay 316, which serves to send the extra long positive release impulse to the sub-station to restore the set to the normal condition. It will be observed that all of the relays 315, 316 and 329 are of the extra slow-to-deenergize or drop-out type.

An auxiliary sending relay 331 of the slow-to-deenergize or drop-out type is provided for initiating the functioning of the positive and negative line relays 301 and 302 a predetermined time after either of the sending relays 307 or 308 is pulled.

Common equipment at the sub-station

Figure 4:
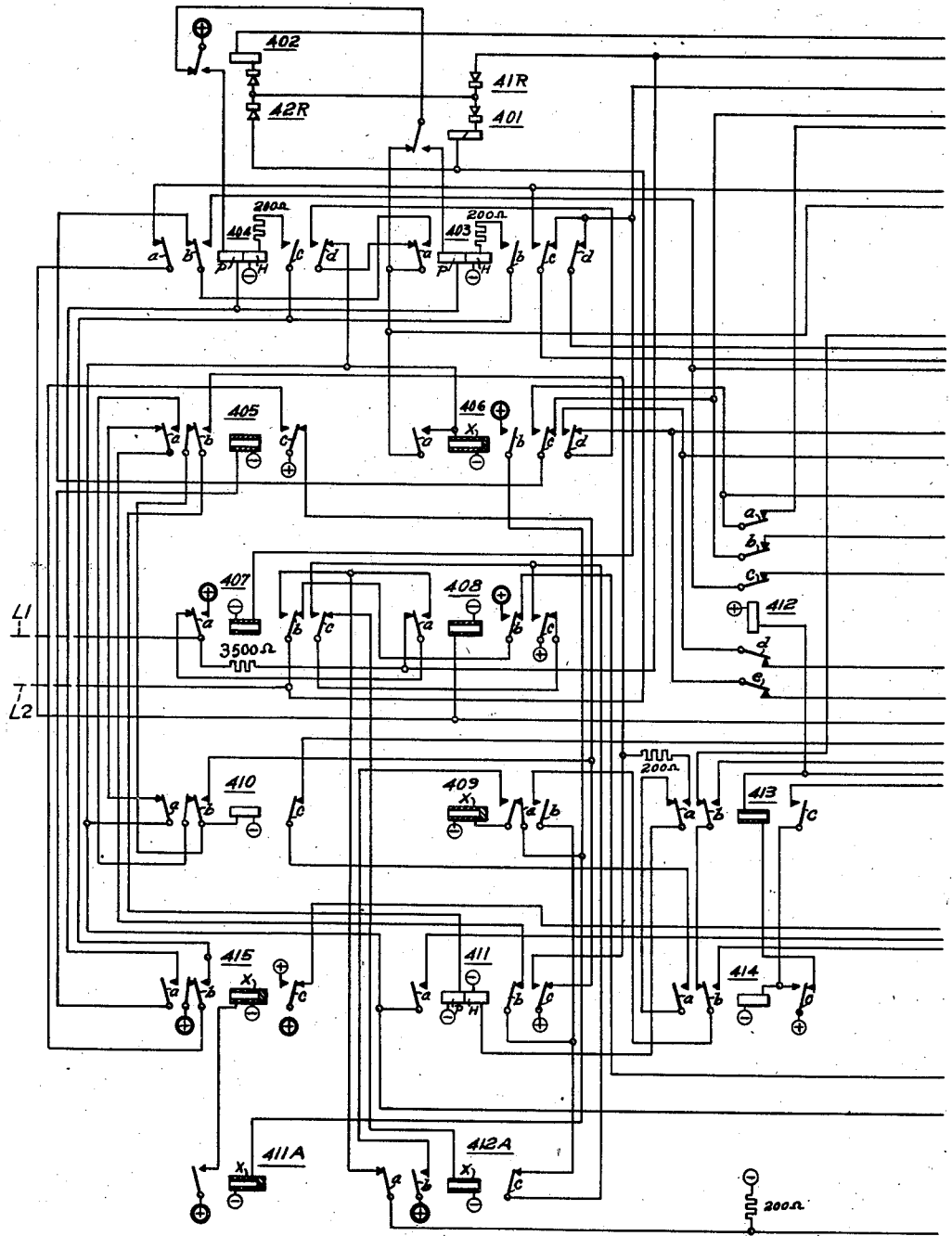
Figs. 4, 5 and 6 illustrate diagrammatically the circuit connections and apparatus which are provided at the remote station or sub-station.

Referring now particularly to Fig. 4 of the drawings, it will be observed that the equipment common to all of the points at the sub-station is there shown. This common equipment is substantially in duplicate of that shown in Fig. 3 of the drawings, and therefore, will not be described in as great detail.

Positive and negative line relays 401 and 402 are provided having associated therewith the dry type of rectifiers 41R and 42R. These relays are arranged to be pulled simultaneously with the corresponding line relays at the office in response to the application of positive or negative impulses to the signalling circuit.

Positive and negative receiving relays 403 and 404 are provided, each having a pulling winding P and a holding winding H.

A neutral receiving relay 405 of the slow-to-deenergize or drop-out type is provided which is arranged to function in conjunction with either of the receiving relays.

A long impulse receiving relay 406 of the extra slow-to-deenergize or drop-out type is provided for effecting certain desired control functions when a long positive or negative impulse is applied to the signalling circuit.

Positive and negative impulses are originated at the sub-station by means of positive and negative sending relays 407 and 408, respectively. These relays are of the slow-to-deenergize or drop-out type.

The long impulse from the sub-station is controlled by means of long impulse sending relay 409 which is of the extra slow-to-deenergize or drop-out type.

After an impulse has been transmitted from the sub-station sending control relays 410 and 411 are pulled in order to prevent the sending of a second impulse, and further, to control the circuits for the receipt of the next impulse from the office. It will be observed that the sending control relay 411 is provided with a pulling winding P and a holding winding H, the holding winding being provided for maintaining the relay pulled under certain operating conditions when the circuit to the pulling winding is opened.

After a point has been selected at the sub-station, selection cut-off relay 412 is pulled to prevent the subsequent selection of a second point until the point selected has been cleared.

When a selection is originated at either station, the receiving circuits are transferred to receive the check impulse. This is accomplished by means of a switching relay 413 which is of the slow-to-deenergize or drop-out type.

After the check impulse has been received, a check relay 414 is pulled to condition the circuits for a subsequent operation.

In order to restore the set to normal, a release relay 415 is provided, together with an auxiliary release relay 411A. When the extra long positive release impulse is applied to the signalling circuit, the auxiliary releasing relay 411A is dropped and in response thereto, the release relay 415 is dropped. It will be observed that the relays 415 and 411A are of the extra slow-to-deenergize or drop-out type.

An auxiliary sending relay 412A is provided for preventing the pulling of the line relays in response to the pulling of the sending relays until after the expiration of a predetermined time interval. Since the auxiliary sending relay 412A is of the slow-to-deenergize or drop-out type, this time delay is determined by the time required for this relay to drop out.

Set under normal conditions

Assuming that none of the circuit breakers at the sub-station is closed, the auxiliary switches associated therewith will be in the open position and the point supervision G relays associated therewith will be dropped. Normally, however, the point start H relays will be pulled.

It will be observed that certain relays have the reference character X above them. This indicates that these relays are normally pulled. Thus the H relays associated with points 1, 2 and 5 are further identified by the reference character X which indicates that normally these relays are pulled, regardless of the position of the circuit breaker associated therewith.

At the office, none of the relays associated with any of the points will normally be pulled. In the event that any of the circuit breakers associated with points 1, 2 and 5 is pulled, then the corresponding point lamp C relay will be pulled. However, since this is not what may be termed a normal condition, these relays are not designated as being normally pulled.

At the office, relays 306, 309, 315, 329 and 331 will normally be pulled. The circuits for pulling these relays will be traced hereinafter, and therefore, will not be set forth at this time.

At the sub-station, the following relays in the common equipment will be pulled: 406, 409, 415, 411A and 412A. The circuits for pulling these relays will be set forth in detail hereinafter.

In accordance with customary practice, the negative terminal of the battery at the office or at the sub-station is indicated by means of the negative polarity sign surrounded by a circle. The direct positive terminal of the battery at either station is indicated by means of the positive polarity sign surrounded by two concentric circles. In order to release the set to normal, it is desirable to drop out simultaneously several of the relays which will have been pulled. This control is effected by connecting these relays to what may be termed positive bus rather than positive battery. Positive bus is indicated by the positive polarity sign surrounded by a single circle.

At the office, normally dropped release control relay 316 serves to connect at its back contacts 316b the positive terminal of the battery with the positive bus. When the release control relay 316 is pulled, this connection is opened and all of the relays at the office which are pulled from the positive bus connection are deenergized.

In like manner, the release relay 415 at the sub-station is arranged to connect at its front terminals 415c the positive terminal of the battery to the positive bus. When the release relay 415 is dropped, this circuit is opened and the relays which are pulled at the substation over the positive bus connection are deenergized.

In order to perform certain functions, it is desirable to have the front contacts of certain of the sets of contact members to make before the back contacts are broken. Such a contact arrangement is illustrated as at the contact members 308a. In this instance, the back contact is illustrated as being pivoted in such manner as to permit its following the movable contact member until it first engages the front contact member. Referring specifically to the release relay 415 it will be observed that the make contact member of the set of contact members 415b is arranged to break after the movable contact member has engaged the fixed contact member.

Explanation of circuit tracing

In view of the fact that the circuit connections illustrated in the drawings are complicated and involve a large number of conductors, no attempt will be made to apply reference characters to any of the conductors aside from the conductors forming the signalling circuit and indicated by the reference characters L1 and L2. The circuits will be traced entirely through the use of battery symbols and the contact members of the relays, twist keys, point operate keys, and resistors.

No attempt will be made to describe each circuit as traced by words, but rather only the contact members, etc., will be employed through the use of symbols. For example, in order to indicate the third set of contact members of the relay 307, the symbol 307c will be used. In the event that the front contacts of this set of contacts are designated, the symbol will be f307c. If the back contacts of this set of contacts are designated the reference character will be b307c.

No reference character will be applied to the individual resistors which are provided in series with the windings of certain of the relays. These resistors are designated on the drawings by their ohmic values and such will be employed when a resistor forms a part of a circuit.

The winding of any of the relays will be designated by the number of the relay followed by the reference character "$w$". Thus, the winding of relay 307 will be designated as 307w.

Assuming that the positive sending relay 307 has been pulled, the circuit for pulling the positive line relay 401 at the sub-station may be traced as follows:

401 pulls: —, 200, b331c, f307b, line L2, 401w, 41R, b408a, b407a, line L1, f307c, +

This circuit in words is as follows: negative battery, resistor 200, the third set of back contacts of relay 331, second set of front contacts of relay 307, line L2, winding of relay 401, rectifier 41R, first set of back contacts of relay 408, first set of back contacts of relay 407, line L1 and third set of front contacts of relay 307 to positive battery.

Outline of detailed description of operation

The following, in brief, indicates the operations which will be described in detail in connection with each of the points. Only a sufficient number of operations will be described in order to indicate to those skilled in the art the functioning of the supervisory control system organized in accordance with my invention. Additional functions or operations will be readily apparent and, therefore, will not be described in greater detail.

Point No. 1

The operation of this point will be described assuming that the circuit breaker associated therewith is in the open position. A selection and check selection operation will be described. After the selection has been checked, the functioning of the system to check the condition of the circuit breaker will then be set forth. After the condition of the circuit breaker has been checked, the circuits will be traced which are used in order to close the circuit breaker. As the result of the closure of the circuit breaker, the corresponding indications will be given at the indicating lights at the office. The circuits will then be traced showing how the circuit breaker associated with this point is tripped. After the completion of this cycle of operations, the functioning of the system to restore to normal will be set forth.

Point No. 2

The selection and checking of selection of point No. 2 will be set forth, together with the operations necessary to effect a checking of the position of the apparatus unit associated with point No. 2.

Point No. 3

The selection and checking of selection of point No. 3 will be set forth. After the point has been selected a description of the functioning of the remote metering will be set forth indicating how the water level meter at the office is connected first to read the sub-station battery voltage, and then to read the potentiometer voltage which is a function of the water level.

Point No. 4

The selection and check of selection of point No. 4 will be set forth in detail, together with the means whereby the gate position meter is first caused to indicate the voltage of the sub-station battery, and then to read the potentiometer voltage which corresponds to the gate position. The steps in the operation to open or raise the gate will be detailed, and in like manner, the steps to close or lower the gate will also be set forth.

Point No. 5

In describing the operation of point No. 5 it will be assumed that the circuit breaker associated therewith is in the closed position and that the point lamp relay 2C5 is pulled to light the red indicating lamp 253. It will be assumed that the circuit breaker associated with this point is automatically tripped. The selection and checking of point No. 5 will be set forth in detail, together with the functioning of the alarm light 2AL and the disagreement lamp flicker relays 232 and 233 in connection with the functioning of the disagreement lamp 251.

Operation of point No. 1

It will be assumed that the operator desires to supervise and operate the circuit breaker associated with point No. 1. Therefore, he depresses the point operate key 1POK1 to select this point at both the office and the sub-station. It will be assumed that the twist key 1TK1 is in the position illustrated in the drawings, which is the position corresponding to the circuit breaker associated with point No. 1 in the tripped position. The green light 114 will be lighted due to the fact that the point lamp relay 1C1 is dropped. The circuit for energizing the green light 114 is obvious.

Selection point No. 1

As the result of the operation of the point operate key 1POK1, the start relay 220 is pulled. The circuit for energizing start relay 220 may be traced as follows:

220 pulls: —, 220w, 1POKc, b220a, b313c, b314c, f309a, b311b, b305c, b310c, f306d, b301, b302, +.

As soon as the start relay 220 pulls it holds over its own front contact members 220a in series with contact members 1POK1c. Thus, the start relay 220 will remain pulled as long as the point operate key 1POK remains in the operated position.

In response to the pulling of the start relay 220 the positive sending relay 307 is pulled in order to apply to the signalling circuit the short positive impulse which forms the code for selecting point No. 1 at both the office and the sub-station. The circuit for pulling the positive sending relay 307 may be traced as follows:

307 pulls: —, 307w, b316c, b303a, 1POKa, f220c, b313c, b314c, f309a, b311b, b305c, b310c, f306d, b301, b302, +.

The short positive selection impulse is not applied to the signalling circuit until the auxiliary sending relay 331 drops. The pulling circuit for relay 331 is completed through the back contacts of 307a and the pulling of relay 307 opens them to drop relay 331. Relay 331 drops due to b307a opening.

As soon as relay 331 drops the positive line relay 301 is pulled. Its pulling circuit may be traced as follows:

301 pulls: —, 200, b331c, f307b, 301w, 31R, b1C3a, 3500, f307c, +.

The positive line relay 401 at the sub-station is also energized due to the application of the short positive impulse. Its pulling circuit may be traced as follows:

401 pulls: —, 200, b331c, f307b, line L2, 401w, 41R, b408a, b407a, line L1, f307c, +.

The pulling of relay 301 opens the pulling circuit for the positive sending relay 307. Due to the fact that relay 307 is a slow-to-drop out relay, its front contact members remain closed for the time required for this relay to drop out. It is this time which determines the length of the short positive impulse.

As a result of the pulling of relay 301, relays 303 and 305 pull in series. The pulling circuit for these relays may be traced as follows:

305 pulls: —, 305w, f315b, 303Pw, f301, b302, +.

Relay 303 holds over the following circuit:

303 holds: —, 303Hw, 200, f303c, f305a, ⊕.

In like manner, at the sub-station relays 403 and 405 pull in series. Their pulling circuit may be traced as follows:

403, 405 pull: —, 405w, f415a, 403Pw, f401, b402, +.

Relay 403 holds over the following circuit:

403 holds: —, 403Hw, 200, f403b, f415b, f405c, ⊕.

In order to stop further sending from the office, sending control relay 310 is pulled. Its pulling circuit may be traced as follows:

310 pulls: —, 310w, b310b, f305c, b311b, b331a, f307a, b308a, +.

Relay 310 holds over the following circuit:

b305a, ⊕.
310 holds: —, 310w, f310b, b1C3c, b311a, ⊕.

It will be observed that relay 310 holds over the back contacts of 311a. However, before relay 311 is pulled, relay 305 drops to complete the holding circuit for relay 310. The holding circuit will be completed as long as one or the other of relays 305 or 311 is dropped. However, when both of them are pulled, the holding circuit for relay 310 will be opened and it will subsequently drop.

As set forth hereinbefore, the pulling circuit for the sending relay 307 was opened due to the pulling of the positive line relay 301. It now drops and as a result, the auxiliary sending relay 331 is pulled. Its pulling circuit may be traced as follows:

331 pulls: —, 331w, b307a, b308a, +.

As soon as the positive sending relay 307 drops, the pulling circuit for the positive line relays 301 and 401 is opened and as a result, they drop. The dropping of the line relays 301 and 401 opens the pulling circuit for relays 303 and 305 at the office, and relays 403 and 405 at the sub-station. However, due to the fact that the neutral receiving relays 305 and 405 are of the slow-to-drop out type, the front contact members thereof will remain closed for a certain time and, therefore, the holding windings of the relays 303 and 403 will maintain these relays pulled. It is during this interval that the pulling of the point selection relays individual to point No. 1 at the office and the sub-station takes place.

The circuit for pulling point selection relay 1B1 may be traced as follows:

1B1 pulls: —, 1B1w, b112a, f306b, b304c, f303d, b301, b302, +.

The circuit for pulling point selection relay 5F1 may be traced as follows:

5F1 pulls: —, 5F1w, b412a, f406c, b404b, f403a, b401, b402, +.

It will now be observed that the point selection relays individual to point No. 1 at the office and the substation have been pulled and that the proper point at each station has been selected.

At this time, the neutral receiving relays 305 and 405 drop since their pulling circuits had been opened due to the dropping of line relays 301 and 401.

305 drops due to 301 dropping.
405 drops due to 401 dropping.
303 drops due to 305 dropping.
403 drops due to 405 dropping.

Sending control relay 311 then pulls in order to set up the circuit for receiving the next impulse from the sub-station. The circuit for energizing relay 311 may be traced as follows:

311 pulls: —, 311Pw, b305b, b1C3b, f310b, b1C3c, b305a, ⊕.

Selection cut-off relay 112 also pulls in order to prevent the selection of any other point until point No. 1 has been restored to normal. The circuit for pulling relay 112 may be traced as follows:

112 pulls: ⊕, 112w, f1B1c, 1B1w, —.

It will be observed that the dropping of relay 303 removed positive battery from 1B1w and as a result, permitted 112w to pull in series with 1B1w.

The circuits are switched to receive the check impulse due to the pulling of the switching relay 313. The pulling circuit for relay 313 may be traced as follows:

313 pulls: positive battery, b314b, 313w, f1B1c, 1B1w, —.

The pulling of switching relay 313 also completed a circuit for energizing the holding winding of the sending control relay 311. The pulling circuit for relay 311Pw would be open subsequently on the pulling of relay 305 and since it is desired to maintain the sending control relay 311 pulled, the holding circuit is completed which may be traced as follows:

311 holds: —, 311Hw, f313d, f311a, ⊕.

At the sub-station, selection cut-off relay 412 pulls in order to prevent the selection of any other point. Its pulling circuit may be traced as follows:

412 pulls: ⊕, 412w, f5F1c, 5F1w, —.

The dropping of relay 403 opens the pulling circuit for 5F1w by removing positive battery therefrom. Thus 412w is permitted to pull in series with 5F1w.

*Check of selection point No. 1*

In order to switch the circuits to transmit the checking pulse back to the office, switching relay 413 is pulled. Its pulling circuit may be traced as follows:

413 pulls: ⊕, b414c, 413w, f5F1c, 5F1w, —.

At the office switching relay 313 pulls over a circuit which may be traced as follows:

313 pulls: ⊕, b314b, 313w, f1B1c, 1B1w, —.

Positive sending relay 407 at the sub-station then pulls to transmit to the office a long positive impulse in order to check the selection and to indicate to the operator that the No. 1 point at the sub-station has been selected, which corresponds to the No. 1 point at the office. The circuit for energizing relay 407 may be traced as follows:

407 pulls: —, 407w, f5F1a, f413b, b414b, f409b, b411b, b405a, b410a, f406a, b401, b402, +.

As a result of the pulling of positive sending relay 407 the pulling circuit for the auxiliary sending relay 412A is opened at back contact members 407c. Due to the dropping of relay 412A a holding circuit is completed for relay 407 which may be traced as follows:

407 pulls: —, 407w, f5F1a, f413b, b414b, f409b, b412Ac, f407c, b408c, ⊕.

As a result of the pulling of the positive sending relay 407 and the dropping of the auxiliary sending relay 412A, the positive line relays 301 and 401 at the office and sub-station, respectively, pull as follows:

401 pulls: —, 200, b412Aa, f407b, 401w, 41R, 3500, f407a, +.

301 pulls: —, 200, b412Aa, f407b, line L2, 301w, 31R, b1C3a, b308c, b307c, line L1, f 407a, +.

It will be observed that the line relays at the station originating a sending impulse pull through a 3500 ohm resistor. Thus, when the positive sending relay 307 is pulled the positive line relay 301 pulls through a 3500 ohm resistor, while the positive line relay 401 pulls directly through the line. In like manner, when the positive sending relay 407 is pulled the positive line relay 401 pulls through a 3500 ohm resistor, while the positive line relay 301 pulls through the line. The 3500 ohm resistor is arbitrarily chosen as representing a line having that amount of resistance. In order to balance the pulling circuits for the line relays, it is desirable to use the line balancing resistor in the manner indicated. If the signalling circuit or line has a smaller resistance, of course the value of this resistor will be correspondingly reduced.

At the sub-station, relays 403 and 405 pull in series and at the office, relays 303 and 305 pull in series. Since the circuits for these relays have previously been traced, they will not again be repeated. Relays 403 and 303 hold over circuits which have been previously traced.

It will be observed that the holding circuit for relay 407 does not include the back contact members of relay 401 and, therefore, the winding of relay 407 is not deenergized as soon as the positive line relay 401 is pulled.

The positive sending relay 407 holds over contact members of the long impulse sending relay 409 and it is not until this relay drops that the winding of relay 407 is deenergized.

At the sub-station relay 410 pulls to prevent any further sending of impulses from the sub-station. The circuit for pulling relay 410 may be traced as follows:

410 pulls: —, 410w, b410b, f405a, b411b, b412Ac, f407c, b408c, ⊕.

410 holds: —, 410w, f410b, b411c, b405c, ⊕.

It will be observed that sending control relay 410 will hold as long as either relay 411 or relay 405 are dropped. At this time, relay 405 is pulled but relay 411 is dropped. When both relays are pulled at the same time, the holding circuit for relay 410 will be opened and this relay will drop.

At the office, relay 310 drops due to the fact that relay 311 had previously pulled and that relay 305 is now pulled.

Due to the fact that the positive line relays 401 and 301 are pulled for an extra long time, long impulse receiving relays 406 and 306 drop out, that is, the pulling circuits for relays 406 and 306 are open for a sufficiently long time to permit these extra slow-to-drop-out relays to drop out.

Due to relay 412A being dropped for an extra long time, the holding circuit for relay 409 is opened and this relay drops. As a result of the dropping of relay 409, the previously traced holding circuit for the positive sending relay 407 is opened and it drops. The dropping of positive sending relay 407 completes a circuit for pulling relay 412A which may be traced as follows:

412A pulls: —, 412Aw, b407c, b408c, ⊕.

The dropping of positive sending relay 407 also opens the pulling circuit for relays 401 and 301 and they drop.

As a result of the preceding sequence of operation, check relays 314 and 414 are pulled to indicate to the operator that the correct selection has been made. The circuits for pulling these relays are as follows:

414 pulls: —, 414w, f413c, f5F1b, b406c, b404b, f403a, b401, b402, +.

314 pulls: — 314w, f313b, f1B1d, b306b, b304c, f303d, b301, b302, +.

Relays 405 and 305 drop due to relays 401 and 301 having previously dropped. As a result, the holding circuits for relays 403 and 303 are opened and these relays drop.

At the sub-station, relay 411 pulls to prepare the circuits for the subsequent reception of an impulse from the office. The circuit for pulling relay 411 may be traced as follows:

411 pulls: —, 411Pw, b405b, f410b, b405c, ⊕.

Due to the pulling of check relays 414 and 314, the pulling circuits for the switching relays 413 and 313 are opened. The switching relays now drop out.

As a result of the dropping of the receiving relays 403 and 303, relays 406 and 409 are pulled at the sub-station, and relay 306 is pulled at the office. The circuits for pulling these relays may be traced as follows:

406 pulls: —, 406w, b404d, b403a, b401, b402, +.
406 holds: —, 406w, f406a, b401, b402, +.
409 pulls: —, 409w, b409a, f406b, +.
409 holds: —, 409w, f409a, f412Ab, +.
306 pulls: —, 306w, b304a, b303d, b301, b302, +.
306 holds: —, 306w, f306d, b301, b302, +.

Due to the dropping of relay 313 the holding circuit for 311Hw is opened and relay 311 drops.

The stop lamp 110 associated with point No. 1 now is lighted to indicate to the operator that the point which he has intended to select has, in fact, been selected. The circuit for lighting stop lamp 110 may be traced as follows:

Stop lamp lights: —, 110, f1B1a, b313b, f314b, ⊕.

*Check of breaker position point No. 1*

No further operation will now take place until the operator initiates an operation from the office. It will be assumed that he wishes to check the position of the circuit breaker associated with the No. 1 point, and therefore, the check key 2CK is operated momentarily. As a result of the operation of the check key 2CK, check control relay 219 pulls. The pulling circuit for this relay may be traced as follows:

219 pulls: —, 219Lw, 2CKa, f220b, f314c, f309a, b311b, b305c, b310c, f306d, b301, b302, +.

As the result of the pulling of the check control relay 219 the operation control relay 218 is pulled. Its pulling circuit may be traced as follows:

218 pulls: —, 218w, f219b, thence over same circuit for 219L2.

It will be observed that relays 218 and 219 hold in over f218b, so that it is not necessary for the operator to hold the check key in the operated position for a longer period of time than is required to pull relay 218.

In order to check the position of the circuit breaker, a short positive impulse is applied to the signalling circuit by the positive transmitting relay 307. The circuit for pulling relay 307 may be traced as follows:

307 pulls: —, 307w, b316c, b303a, f219a, f218b, f220b, thence over circuit for pulling relay 219.

Relay 331 drops due to the pulling of relay 307 and as a result, line relays 301 and 401 at the office and substation, respectively pull over circuits which have previously been traced.

Relays 303 and 305 at the office pull in series as a result of line relay 301 pulling. At the sub-station, relays 403 and 405 pull in series as a result of the positive line relay 301 pulling.

Relay 411 holds over a circuit which may be traced as follows:

411 holds: —, 411Pw, f405b, f411c, ⊕.

At the office, sending control relay 310 pulls over a circuit which has previously been traced to prevent further sending and this relay holds over a circuit which has also previously been traced.

At the sub-station sending control relay 410 drops due to relay 405 pulling, relay 411 having previously been pulled.

The pulling of relay 301 opens the previously described pulling circuit for relays 218 and 219. However, these relays are held over a circuit which may be traced as follows:

218, 219 hold —, 219Lw, f219b, or —, 218w, thence f218b, f220b, f314c, f309a, b331a, f301a, b308a, +.

As a result of relay 301 pulling the pulling circuit for the positive sending relay 307 is opened and it drops. Positive line relays 301 and 401 then drop and since the holding circuits for relays 218 and 219 are now opened, they also drop.

Relays 305 and 405 drop due to the dropping of positive line relays 301 and 401, respectively, and as a result, relays 303 and 304 drop.

Relay 311 then pulls to prepare for the release of relay 310 on the reception of the next impulse over a circuit which has previously been traced.

At the sub-station, as a result of the dropping of the positive line relay 401, relays 405 and 403 drop.

Since the holding circuit for relay 411 is no longer completed at contacts f405b, it drops.

Since the circuit breaker associated with point No. 1 is tripped, a short negative impulse is applied to the signalling circuit by means of the negative sending relay 408, which is now pulled. The pulling circuit for relay 408 may be traced as follows:

408 pulls: —, 408w, b404a, b5G1a, f5F1d, f414b, f409b, b411b, b405a, b410a, f406a, b401, b402, +.

Relay 412A drops due to the pulling of the negative sending relay 408 and then negative line relays 402 and 302 pull, in response to the application of the negative impulse to the signalling circuit over circuits which may be traced as follows:

402 pulls: —, 200, b412Aa, f408a, b407a, 3500, b5G3c, b6G4c, 402w, 42R, b407b, f408b, +.
302 pulls: —, 200, b412Aa, f408a, b407a, line L1, b307c, b308c, b1C3a, 302w, 32R, line L2, b407b, f408b, +.

At the sub-station relays 404 and 405 pull in series. This circuit may be traced as follows:

404, 405 pull: —, 405w, f415a, 404Pw, f402, +.
404 holds: —, 404Hw, 200, f404c, f415b, f405c, ⊕.

At the office, relays 304 and 305 pull in series over a circuit which may be traced as follows:

304, 305 pull: —, 305w, f315b, 304Pw, f302, +.
304 holds: —, 304Hw, 200, f304b, f305a, ⊕.

Relay 311 holds over a circuit which may be traced as follows:

311 holds: —, 311Pw, f305b, f311a, ⊕.

At the sub-station, sending control relay 410 pulls to prevent further sending over a circuit which may be traced as follows:

410 pulls: —, 410w, b410b, f405a, b411b, b412Ac, f408c, ⊕.
b405c, ⊕.
410 holds: —, 410w, f410b, b411c, ⊕.

At the office relay 310 drops due to the neutral receiving relay 305 being pulled and relay 311 having previously been pulled.

Since the negative sending relay 408 is pulled through the back contacts of negative line relay 402, it drops due to these back contacts being opened. Therefore, it will be understood that the lengths of the short negative impulses are controlled by the drop-out time of the negative sending relay 408. At the office negative line relay 302 also drops due to the dropping of the negative sending relay 408 at the substation.

In view of the fact that the green indicating light 114 is lighted due to the point lamp relay 1C1 being dropped, no further operation takes place at this time. However, had the point lamp relay 1C1 been pulled and red indicating lamp 113 lighted, it would be apparent that the position of the circuit breaker did not correspond to the indication given at the office. Therefore, the winding of the point lamp relay 1C1 would have been shunted down at this time over a circuit which may be traced as follows:

Shunt circuit for 1C1w: +, b302, b301, b303d, f304a, f306a, b317, b310a, f314a, b313a, f1B1c, 1C1w.

Since positive battery would be applied to both terminals of 1C1w under these conditions, it would be shunted down if it had been pulled.

After the position of the circuit breaker at point No. 1 has been checked, relays 305 and 405 drop and as a result, relays 304 and 404 drop.

Relay 411 drops due to the dropping of the relay 305 which opens the previously traced holding circuit for relay 311.

At the sub-station, relay 411 pulls over a circuit which has previously been traced to prepare for the reception of an operation impulse transmitter from the office.

*Closing the circuit breaker point No. 1*

The operator desiring to close the circuit breaker associated with point No. 1 turns twist key 1TK1 to the close position. The disagreement lamp 111 immediately is caused to flicker due to the twist key 1TK1 being in a position which does not correspond to the indicating lamp 114, which is lighted indicating that the circuit breaker is in the tripped position. The disagreement lamp 111 flickers due to the successive pulling and dropping of the disagreement lamp flicker relays 232 and 233 over circuits which may be traced as follows:

232 pulls: —, 232w, 111, 1TK1a, b1C1a, +.
233 pulls: —, 233w, f232, +.

The pulling of relay 233 places negative battery on both sides of 232w, causing it to be shunted down and to permit full voltage to be applied to the disagreement lamp 111. The shunting down of relay 232, however, opens the pulling circuit for relay 233 and it then drops. Removal of the negative battery from both sides of 232w permits relay 232 to pull in series with the disagreement lamp 111 and it is extinguished. This cycle of operation continues until the point lamp relay 1C1 is pulled to cause the indicating lamps at point No. 1 to correspond to the position of the twist key 1TK1, or until he returns twist key to original position.

In order to close the circuit breaker, a control impulse comprising a short positive impulse followed by a short negative impulse is transmitted over the signalling circuit by the successive pulling and dropping out of the transmitting relays 307 and 308. In order to initiate the control impulse the master control key 2MCK is depressed which, in turn, causes the operation control relay 218 to pull over a circuit which may be traced as follows:

218 pulls: —, 218w, 2MCKa f220b, f314c, f309a, b311b, b305c, b310c, f306d, f301, b302, +.

It will be observed that the operation of control relay 218 holds over its own front contacts 218b, thereby shunting contact members 2MCKa of the master control key and rendering it unnecessary to hold it in the operated position for a time longer than is necessary to pull relay 218.

Positive transmitting relay 307 is then pulled over a circuit which may be traced as follows:

307 pulls: —, 307w, b316c, b303b, ITKId, f1B1b, b219a, thence over the circuit for pulling 218.

Relay 331 drops due to the pulling of relay 307 and positive receiving relays 301 and 401 are pulled.

Relays 303 and 305 pull in series over a circuit which has previously been traced, and relay 303 holds over a circuit which also has previously been traced.

At the sub-station, relays 403 and 405 pull in series and relay 403 holds over circuits which have previously been traced.

Relay 411 at the sub-station also holds over front contact members 405b, as has previously been set forth. Due to relays 405 and 411 both being pulled, the holding circuit for relay 410 at the sub-station is opened and it drops.

At the office, relay 308 pulls to transmit the negative impulse as soon as the positive sending relay 307 has completed sending the positive impulse. The circuit for pulling relay 308 may be traced as follows:

308 pulls: —, 308w, b304d, f303b, ITKId, f1B1b, b219a, f218b, f220b, f314c, f309a, b331a, f307a, b308a, +.

It will then be observed that relay 308 will hold in over its own front contacts 308a and that it will not be affected by the subsequent dropping of positive sending relay 307.

Relay 310 pulls in order to prevent further sending after the control impulse has been transmitted. Its pulling circuit may be traced as follows:

310 pulls: —, 310w, b310b, f305c, b311b, b331a, f308a, +.

b305a, ⊕.

310 holds: —, 310, f310b, b1C3c, b311a,

The positive sending relay 307 now drops due to the pulling of relay 303 and as a result, the positive line relays 301 and 401 drop.

Negative line relays 302 and 402 are immediately pulled due to the fact that relay 307 has dropped and the negative sending relay 308 has previously been pulled. The circuits for pulling these relays have previously been traced, and will not again be set forth.

Relays 304 and 404 then pull in series with relays 305 and 405, respectively. At this time, it will be understood that both the positive and negative receiving relays 303 and 304 at the office and the corresponding relays 403 and 404 at the sub-station will be pulled.

Relay 308 then drops due to the pulling of relay 304, and, in turn, the operation control relay 218 drops due to the dropping of relay 308. The auxiliary sending relay 331 then pulls since now both the positive and the negative sending relays 307 and 308 have dropped. Negative line relays 302 and 402 drop due to 308 dropping.

Due to the circuits which have been completed by relays 403 and 404 being pulled at the same time, the closing relay 5C1 is pulled over a circuit which may be traced as follows:

5C1 pulls: —, 411Hw, b413a, f414a, b410c, f5F1e, b5G1c, 5C1w, f404b, f403a, b401, b402, +.

5C1 holds: —, 411Hw, b413a, f414a, b410c, f5F1e, b5G1c, 5C1w, f5C1a, b401, b402, +.

Due to the pulling of closing relay 5C1 the circuit breaker associated with this point is operated to the closed position, as will be readily understood.

Neutral receiving relays 305 and 405 drop due to the dropping of negative line relays 302 and 402 respectively. As a result of the dropping of relays 305 and 405, relays 303 and 304 at the office and relays 403 and 404 at the sub-station drop.

Relay 411 drops due to the dropping of relay 405 which opens the holding circuit that had previously been set up for this relay. At the office, relay 311 is pulled as soon as relay 305 drops over a circuit which has previously been traced.

Due to the closing of the circuit breaker associated with point No. 1, auxiliary switch 5AS1 closes to complete an obvious circuit for pulling point supervision relay 5G1.

Due to the opening of the back contacts of 5G1c, the closing relay 5C1 drops. Also due to the opening of the back contacts 5G1b, the point start relay 5H1 drops. It will be observed that the point start relay 5H1 was held in over its own front contacts 5H1a. The movement of the contact members 5G1b is sufficiently slow to permit the winding of the point start relay 5H1 to be deenergized, while the movable contact member is moving from the back to the front contact member.

*Supervision of point No. 1*

When the circuit breaker associated with point No. 1 has been operated to the closed position, it is desirable that an indication of such operation be given to the office, which indication will be in the form of the lighting of the red indicating lamp 113 and the extinguishment of the green indicating lamp 114. A supervision impulse comprising a short positive impulse is transmitted from the sub-station to the office by the positive sending relay 407. The circuit for energizing relay 407 may be traced as follows:

407 pulls: —, 407w, b403d, f5G1a, f5F1d, f414b, f409b, b411b, b405a, b410a, f406a, b401, b402, +.

Auxiliary sending relay 412A then drops due to the pulling of relay 407 and as a further result positive line relays 401 and 301 are pulled over circuits which have previously been traced.

At the office positive and neutral receiving relays 303 and 305 pull and at the sub-station the corresponding relays 403 and 405 pull. At the sub-station relay 410 pulls over a circuit which has previously been traced, and it holds over a circuit which also has previously been traced. At the office relay 310 drops due to relay 305 pulling and since relay 311 had previously pulled.

As a result of positive line relay 401 pulling, the positive sending relay 407 drops and immediately the positive line relays 401 and 301 drop. Also due to the dropping of positive sending relay 407 the auxiliary sending relay 412A is again pulled.

Supervision relay 317 at the office now pulls in order to pull the point lamp relay 1C1 for the purpose of lighting the red indicating lamp 113 and extinguishing the green indicating lamp 114. The circuit for pulling relay 317 may be traced as follows:

317 pulls: —, 317w, f305b, b304c, f303d, b301, b302, +.

In response to the pulling of the supervision relay 317 the point lamp relay 1C1 is pulled over a circuit which may be traced as follows:

1C1 pulls: —, 200, f317, b318a, f314a, b313a, f1B1e, 1C1w, +.

1C1 holds: +, 1C1w, f1C1b, 100, —.

The neutral receiving relays 305 and 405 drop due to the dropping of the corresponding positive line relays 301 and 401 and as a result, relays 303 and 403 drop. The holding circuit for relay 311 at the office having been opened due to the dropping of relay 305, it drops, while at the sub-station, relay 411 pulls over a circuit which has previously been traced. As a further result of relay 303 dropping, the pulling circuit for the supervision relay 317 is opened and it drops.

The circuit breaker is now in the closed position and at the office, the twist key corresponds to this position and the red indicating lamp is lighted. No further operation will take place at this time until an operation is initiated by the operator.

*Trip circuit breaker point No. 1*

While still on point No. 1 it will be assumed that the operator wishes to trip the circuit breaker associated therewith. In order to effect this operation, he operates the twist key 1TK1 to the trip position, which is the position in which it is illustrated in the drawings. The disagreement lamp flicker relays 232 and 233 are again caused to operate to flash the disagreement lamp 111. The circuit for pulling relay 232 may be traced as follows:

232 pulls: —, 232w, 111, 1TK1b, f1C1a, +.

The subsequent operation of the flicker relays 232 and 233 will be as described hereinbefore and will not be repeated.

The operator then depresses the master control key to pull the operation control relay 218 and, in turn, to pull the positive sending relay 307 in order to send a long positive impulse for effecting the trip operation. The circuits for energizing these relays may be traced as follows:

218 pulls: —, 218w, 2MCKa, f220b, f314c, f309a, b311b, b305c, b310c, f306d, b301, b302, +.

307 pulls: —, 307w, b316c, 1TK1c, f1B1b, b219a, f218b, f220b, thence over the circuit for 218.

Due to the pulling of relay 307, the auxiliary sending relay 331 drops. Relay 307 then holds over a circuit which may be traced as follows:

307 holds: —, 307w, b316c, 1TK1c, f1B1b, b219a, f218b, f220b, f314c, f309a, b331a, f307a, b308a, +.

Positive line relays 301 and 401 will be pulled due to the application of the positive impulse to the signalling circuit. Since the winding of relay 307 remains energized over the holding circuit it will not drop out due to the pulling of the positive line relay 301.

At the office, relays 303 and 305 pull in series and at the sub-station the corresponding relays 403 and 405 pull in series. At the office, relay 310 pulls and at the sub-station relay 410 drops.

Due to the fact that positive line relays 301 and 401 are pulled for an extra long time, the long impulse receiving relays 306 and 406 drop. Due to the fact that the auxiliary sending relay 331 at the office is dropped for an extra long time, the long impulse sending relay 309 is dropped. The dropping of the long impulse sending relay 309 opens the holding circuit for the positive sending relay 307 and it drops, pulling the auxiliary sending relay 331. The positive line relays 301 and 401 then drop due to the dropping of the positive sending relay 307. As a further result of the dropping of relay 307 the operation control relay 218 which had previously been held over the front contacts of 307a, drops.

At the sub-station the trip relay 5T1 pulls over a circuit which may be traced as follows:

5T1 pulls: —, 411Hw, b413a, f414a, b418c, f5F1e, f5G1c, 5T1w, b406c, b404b, f403a, b401, b402, +.

5T1 holds: —, 411Hw, b413a, f414a, b418c, f5F1e, f5G1c, 5T1w, f5T1a, b401, b402, +.

The circuit breaker then trips in response to the operation of the trip relay 5T1.

At the office, as a result of the dropping of the positive line relay 301 relay 306 is pulled and it holds over circuits which have previously been traced. Likewise, relay 309 pulls and holds over circuits which may be traced as follows:

—309 pulls: —, 309w, b309b, f306c, +.

309 holds: —, 309w, f309b, f331b, +.

Neutral receiving relays 305 and 405 at the office and sub-station drop, and as a result, positive receiving relays 303 and 403 drop.

Due to the tripping of the circuit breaker the auxiliary switch 5AS1 is opened and the point supervision relay 5G1 drops. Also at the sub-station relay 411 drops and due to the fact that relay 5G1 has dropped, the tripping relay 5T1 drops.

It is then desirable to transmit a supervision impulse back to the office to indicate that the circuit breaker associated with point No. 1 is in the tripped position. This is accomplished by transmitting to the office a short negative impulse, by the pulling of the negative sending relay 408 over a circuit which may be traced as follows:

408 pulls: —, 408w, b404a, b5G1a, f5F1d, f414b, f409b, b411b, b405a, b410a, f406a, b401, b402, +.

Relay 412A drops due to relay 408 pulling.

Negative line relays 302 and 402 pull over circuits which have previously been traced in response to the pulling of the negative sending relay 408. The negative and neutral receiving relays 304 and 305 at the office and 404 and 405 at the sub-station are pulled in series as has been set forth hereinbefore, while at the office, the sending control relay 310 drops due to the pulling of relay 305 and at the sub-station relay 410 pulls and holds over circuits which have previously been traced.

Due to the pulling of negative line relay 402 the pulling circuit for the negative sending relay 408 is opened and it drops. Relay 412A pulls and negative line relays 302 and 402 drop.

As a result of the pulling of the negative receiving relay 304, positive battery is applied to both sides of the winding of the point lamp relay 1C1 over a circuit which has previously been traced, and it is shunted down. The red indicating lamp 113 is then extinguished and the green indicating lamp 114 is lighted to indicate that the circuit breaker is in the open position.

The neutral receiving relays 305 and 405 then drop and as a result, the negative receiving relays 304 and 404 drop. Also at the office, relay 311 drops due to the opening of its holding circuit on the dropping of relay 405, while at the sub-station, relay 411 pulls.

No further operation will take place until the operator initiates an operation from the office.

Restore to normal point No. 1

In order to restore the equipment to normal, a long positive impulse is transmitted over the signalling circuit to the sub-station. This long impulse is obtained by connecting the positive sending relay 307 directly to positive battery by the release control relay 316 which is an extra slow-to-drop-out relay. The application of the extra long positive impulse pulls the positive line relays 301 and 401 for an extra long time, thereby permitting certain relays which would otherwise not drop out, to drop out. Also the connection between positive battery and positive bus is opened to drop out all of the relays which are pulled over the positive bus.

In order to restore the set to normal, the point operate key 1POK1 is restored to its original position. As a result, the start relay 220 which was previously held pulled over its own front contact members 220a and 1POK1c contact members drops. The release control relay 316 then pulls over a circuit which may be traced as follows:

316 pulls: —, 316w, b316a, b220b, f314c, f309a, b311b, b305c, b310c, f306d, b301, b302, +.
316 holds: —, 316w, f316a, f315a, +.

The pulling of relay 316 opens at contact members 316b, the connection at the office between the positive battery and the positive bus. As a result, relays 112, 314 and 1B1 drop since these relays were held pulled over the positive bus circuit.

As a further result of the pulling of the release control relay 316 the positive sending relay 307 is pulled to transmit the extra long impulse. The circuit for pulling the positive sending relay 307 may be traced as follows:

307 pulls: —, 307w, f316c, +.

As a result of the pulling of the positive sending relay 307 the auxiliary sending relay 331 drops and positive line relays 301 and 401 pull. In response to the pulling of the positive line relays 301 and 401 at the office, relays 303 and 305 pull in series and at the sub-station, relays 403 and 405 pull in series. Since the holding circuit for relay 410 is opened, it drops.

Due to the fact that the positive line relays 301 and 401 are pulled for an extra long time the long impulse receiving relays 306 and 406 drop, and as a result of the dropping of relay 306, relay 309 also drops.

Auxiliary release relay 329 at the office drops due to the dropping of relay 306 and it, in turn, opens an obvious pulling circuit for the release relay 315 which drops. At the sub-station, the auxiliary release relay 411A drops due to the dropping of relay 406, and as a result, the release relay 415 drops, opening at contact members 415c one of two connections at the sub-station between positive bus and positive battery. The other connection ⊕, b415b, f405c, ⊕.

Since the connection between positive bus and positive battery at the office has been opened due to the pulling of relay 316, the positive receiving relay 303 drops and relay 403 drops due to the dropping of the release relay 415.

At the sub-station, the point start relay 5H1 pulls over a circuit which may be traced as follows:

5H1 pulls: —, 5H1w, b5G1b, f5F1f, b415c, +.

The neutral receiving relays 305 and 405 which, it will be recalled, are slow-to-drop-out relays, now drop. At the sub-station, relay 411 drops due to the dropping of relay 405. Further, due to the opening of the positive bus connections by the release relay 415 and dropping of relay 405, relays 412, 414 and 5F1 drop since they were pulled over the positive bus connection.

At the office, due to the dropping of the release relay 315, the holding circuit for the release control relay 316 is opened and it drops. Since the positive sending relay 307 was pulled directly over the front contact members 316c, it drops, pulling the auxiliary sending relay 331. In response to the dropping of the positive sending relay 307 the positive line relays 301 and 401 drop.

At the office, the long impulse receiving relay 306 pulls and holds and, in turn, the long impulse sending relay 309 pulls and holds over circuits which have been previously traced. At the sub-station, in like manner, the long impulse receiving relay 406 pulls.

At the office, the auxiliary release relay 329 pulls over a circuit which may be traced as follows:

329 pulls: —, 329w, f306c, +.

The release relay 315 then pulls in response to the pulling of the auxiliary release relay 329 over an obvious circuit.

At the sub-station the auxiliary release relay 411A pulls over a circuit which may be traced as follows:

411A pulls: —, 411Aw, f406b, +.

In response to the pulling of relay 411A the release relay 415 pulls over an obvious circuit.

The connections at the office and the substation between positive bus and the positive battery are restored by the dropping of the release control relay 316 and the pulling of the release relay 415. The set is now restored to normal and is ready for a subsequent operation initiated either at the office or at the substation.

Operation of point No. 2

In describing the operation of point No. 2, which is provided solely for the purpose of supervising the position of the circuit breaker associated with this point at the sub-station, it will be assumed that the circuit breaker is closed, that the point release relay 1C2 is dropped, and that the green indicating lamp 124 is lighted indicating that the circuit breaker is tripped.

The relays at the office which are pulled at this time are as follows: 306, 309, 315, 329 and 331. At the sub-station, the relays which are pulled are as follows: 406, 409, 415, 411A, 412A, 5G2, 5H1, 5H2 and 6H5.

Selection of point No. 2

In order to select point No. 2 the operator operates the point operate key 1POK2 and as a result, the start relay 229 is pulled. Its pulling circuit may be traced as follows:

220 pulls: —, 220w, lPOK2c, b220a, b313c, b314c, f309a, b311b, b305c, b310c, f306d, b301, b302, +.

220 holds: —, 220w, lPOK2c, f220a, +.

In order to select point No. 2, a long positive impulse is transmitted by the positive sending relay 307 which impulse is the selection code for this point. Relay 307 pulls over the following circuit:

307 pulls: —, 307w, b310c, lPOK2a lPOK1b, f220c, b313c, b314c, f309a, b311b, b305c, b310c, f306d, b301, b302, +.

Due to the pulling of relay 307 the auxiliary sending relay 331 drops.

In response to the pulling of the positive sending relay 307 the positive line relays 301 and 401 pull over circuits which have previously been traced. Since in this selection it is necessary that the positive sending relay 307 be pulled for a long time, a holding circuit is provided which is independent of the operation of the positive line relay 301. This holding circuit is as follows:

307 holds: —, 307w, b310c, lPOK2a, lPOK1b, f220c, b313c, b314c, f309a, b331a, f307a, b308a, +.

As long as the long impulse sending relay 309 remains pulled the holding circuit for positive sending relay 307 will be completed.

At the office, the positive and neutral receiving relays 303 and 305 pull and relay 303 holds while at the sub-station, positive and neutral receiving relays 403 and 405 pull in series and relay 403 holds, all over circuits which have previously been traced.

At the office, sending control relay 310 pulls in order to prevent further sending after the selection impulse has been transmitted. The circuit for pulling relay 310 may be traced as follows:

310 pulls: —, 310w, b310b, f305c, b311b, b331a, f307a, b308a, +.

b305a, ⊕.

310 holds: —, 310w, f310b, b1C3c, b311a, ⊕.

Due to the fact that the positive line relays 301 and 401 are pulled for a long time in response to the long positive impulse, the long impulse receiving relays 306 and 406 drop. At the office, as a result of the dropping of relay 306, the long impulse sending relay 309 drops opening the holding circuit for the positive sending relay 307, and in turn, it drops, pulling the auxiliary relay 331. A further result of the dropping of the positive sending relay 307 is to drop the positive line relays 301 and 401.

Point No. 2 is now selected by the pulling of the point selection relays 1B2 at the office and 5F2 at the sub-station. The circuits for pulling these relays may be traced as follows:

1B2 pulls: —, 1B2w, b112b, b306b, b304c, f303d, b301, b302, +.

5F2 pulls: —, 5F2w, b412b, b406c, b404b, f403a, b401, b402, +.

The neutral receiving relays 304 and 405 now drop due to the dropping of the positive line relays 301 and 401 and, in turn, the positive receiving relays 303 and 403 drop. At the office, the long impulse receiving relay 306 pulls and holds and, in turn, the long impulse sending relay 309 pulls and holds over circuits which have previously been traced. At the sub-station, the long impulse receiving relay 406 pulls and holds as soon as the positive receiving relay 403 drops over circuits which have previously been traced.

At the office the sending control relay 311 now pulls over a circuit which may be traced as follows:

311 pulls: —, 311Pw, b305b, b1C3b, f310b, b1C3c, b305a, +.

The dropping of the positive receiving relay 303 removed positive battery from the winding of the point selection relay 1B2 and as a result, the selection cut-off relay 112 is permitted to pull in series with the point selection relay 1B2 over a circuit which may be traced as follows:

112 pulls: ⊕, 112w, f1B2b, 1B2w, —.

In like manner, at the sub-station, the selection cut-off relay 412 pulls over a circuit which may be traced as follows:

412 pulls: ⊕, 412w, f5F2c, 5F2w, —.

Check of selection of point No. 2

In order to check the selection of the point which the operator desires to supervise, the circuits are now transferred to the check circuit. Switching relays 313 and 413 pull at the office and the sub-station, respectively, over circuits which may be traced as follows:

313 pulls: ⊕, b314b, 313w, f1B2b, 1B2w, —.
413 pulls: ⊕, b414c, 413w, f5F2c, 5F2w, —.

A holding circuit for the sending control relay 311 is completed by the pulling of the switching relay 313 as follows:

313 holds: —, 311Hw, F313d, f311a, ⊕.

In this instance, since the circuit breaker associated with point No. 2 is assumed to be in the closed position, a short positive impulse is transmitted over the signalling circuit to the office to indicate that the circuit breaker is in this position. The positive sending relay 407 at the sub-station pulls to transmit the short impulse over a circuit which may be traced as follows:

407 pulls: —, 407w, b403d, f5F2a, f413b, b414b, f409b, b411b, b405a, b410a, f406a, b401, b402, +.

As a result of the pulling of relay 407 the auxiliary sending relay 412A drops and the positive line relay 401 and 301 pull over circuits which have previously been traced.

At the sub-station positive and neutral receiving relays 403 and 405 pull and relay 403 holds, while at the office, positive and neutral receiving relays 303 and 305 pull in series and relay 303 holds over circuits which have previously been traced.

At the sub-station, sending control relay 410 pulls in order to prevent the sending of another impulse over a circuit which may be traced as follows:

410 pulls: —, 410w, b410b, f405a, b411b, b412Ac, f407c, b408c, ⊕.

b405c, ⊕.

410 holds: —, 410w, f410b, b411c, ⊕.

At the office sending control relay 310 drops due to the pulling of the neutral receiving relay 305 and further due to the fact that the sending control relay 311 had previously been pulled.

Due to the pulling of the positive line relay 401, the positive sending relay 407 drops. The auxiliary sending relay 412A pulls and the positive line relays 401 and 301 drop. The check relays 414 and 314 then pull and hold over circuits which may be traced as follows:

414 pulls: —, 414w, f413c, f5F2b, f406c, b404b, f403a, b401, b402, +.

414 holds: —, 414w, f414c, ⊕.

314 pulls: —, 314w, f313b, f1B2e, f306b, b304c, f303d, b301, b302, +.

314 holds: —, 314w, f314b, ⊕.

Due to the dropping of the positive line relays 401 and 301 the neutral receiving relays 405 and 305 drop and as a result, the positive receiving relays 403 and 303 drop. The sending control relay 411 at the sub-station the pulls over a circuit which may be traced as follows:

411 pulls: —, 411Pw, b405b, f410b, b405c, ⊕.

Due to the pulling of the check relays 414 and 314 the switching relays 413 and 313 drop. As a result of the dropping of the switching relay 313 at the office the holding circuit for the sending control relay 311 is opened and it drops.

The stop lamp 120 associated with point No. 2 is then lighted to indicate to the operator that the proper selection had been made. The circuit for lighting the stop lamp 120 may be traced as follows:

Stop lamp lights: —, 120, f1B2a, b313b, f314b, ⊕.

*Check breaker position point No. 2*

In order to check the position of the circuit breaker the operator momentarily depresses the check key 2CK2 and as a result, the check control relay 219 in turn pulls the operation control relay 218 over circuits which have been traced hereinbefore. Relay 219 and relay 218 hold over the front contacts 218b.

In order to check the breaker position a short positive impulse is transmitted by energizing the positive sending relay 307 to apply the short positive impulse to the signalling circuit. Relay 307 now pulls over a circuit which may be traced as follows:

307 pulls: —, 307w, b316c, b303a, f219a, f218b, f220b, f314c, f309a, b311b, b305c, b310c, f306d, b301, b302, +.

Due to the pulling of the positive sending relay 307 the auxiliary sending relay 331 drops, thereby completing a holding circuit for relays 219 and 218 over the front contact members of 307b, as has been set forth hereinbefore, and preventing their dropping out on the subsequent pulling of the positive line relay 301.

In response to the pulling of the positive sending relay 307, the positive line relays 301 and 401 pull.

At the office, the positive and neutral receiving relays 303 and 305 pull in series and relay 303 holds, while at the sub-station positive and neutral receiving relays 403 and 405 pull in series and relays 403 holds. Also at the sub-station, the sending control relay 411 holds over a circuit which may be traced as follows:

411 holds: —, 411w, f405b, f411c, ⊕.

Sending control relay 410 drops due to the pulling of relay 405, relay 411 having previously been pulled.

At the office, sending control relay 310 pulls and holds over circuits which have previously been traced to prevent the sending of a subsequent impulse from the office until the impulse has been received from the substation.

Due to the pulling of line relay 301 the positive sending relay 307 drops, pulling the auxiliary sending relay 331 and dropping the positive line relays 301 and 401. Also the holding circuit for relays 219 and 218 is opened and they drop.

Due to the dropping of the positive line relays 301 and 401, the neutral receiving relays 305 and 405 drop and, in turn, the positive receiving relays 303 and 403 drop. At the office, sending control relay 311 pulls and at the sub-station relay 411 drops due to the drop of relay 405.

Since the circuit breaker associated with point No. 2 is assumed to be in the closed position, positive sending relay 407 pulls to transmit to the office a short positive impulse indicating that the circuit breaker is in the closed position. Relay 407 pulls over a circuit which may be traced as follows:

407 pulls: —, 407w, b403d, f5G2a, f5F2d, f414b, f409b, b411b, b405a, b410a, f406a, b401, b402, +.

As a result of the pulling of positive sending relay 407 the auxiliary sending relay 412A drops and the positive line relays 401 and 301 pull. In response thereto, positive and neutral receiving relays 403 and 405 pull in series and relay 403 holds at the sub-station, while positive and neutral receiving relays 303 and 305 pull in series and relay 303 holds at the office.

At the office sending control relay 310 drops due to relay 305 pulling and relay 311 having previously pulled, while at the sub-station sending control relay 410 pulls and holds over circuits which have previously been traced, in order to prevent the sending of a subsequent impulse from the sub-station until an impulse has been received from the office.

Due to the pulling of the positive line relay 401, the positive sending relay 407 drops and as a result, the auxiliary sending relay 412A pulls. As a further result of the dropping of the positive sending relay 407 the positive line relays 401 and 301 drop.

At the office, the supervision relay 317 pulls to pull the point lamp relay IC2 in order to indicate that the circuit breaker is in the closed position. The circuits for pulling these relays may be traced as follows:

317 pulls: —, 317w, f306b, b304c, f303d, b301, b302, +.

IC2 pulls: +, IC2w, f1B2d, b313a, f314a, b310a, f317, 200, —.

The red indicating light 123 now is lighted to indicate to the operator that the circuit breaker associated with point No. 2 at the sub-station is in the closed position.

Due to the dropping of line relays 301 and 401, the neutral receiving relays 305 and 405 drop and, in turn, the positive receiving relays 303 and 403 drop. The dropping of the positive receiving relay 303 opens the pulling circuit for the supervision relay 317 and it drops.

Assuming that the circuit breaker associated with point No. 2 at the sub-station had been tripped and that the point lamp relay IC2 had been pulled, the sequence of operation to indicate that the circuit breaker is in the tripped position will be set forth in detail. It will be assumed that point No. 2 has been selected and checked and that the impulse for checking the breaker position has been transmitted to the substation. It will be understood that the point supervision relay 5G2 will be dropped due to the auxiliary switch 5AS2 being in the open position.

Since the circuit breaker is assumed to be in the open position a short negative impulse will be transmitted from the sub-station to the office to indicate this position of the circuit breaker. Negative sending relay 408 is pulled rather than the positive sending relay 407 as described hereinbefore, over a circuit which may be traced as follows:

408 pulls: —, 408w, b404a, b5G2a, f5F2d, f414b, f409b, b411b, b405a, b410a, f406a, b401, b402, +.

The auxiliary sending relay 412A drops due to the pulling of the negative sending relay 408 and the negative line relays 402 and 302 at the sub-station and office, respectively, pull.

As a result of the pulling of the negative line relays 402 and 302 the negative and neutral receiving relays 404 and 405 pull in series, and relay 404 holds at the sub-station while at the office, negative and neutral receiving relays 304 and 305 pull in series and relay 304 holds over circuits which have previously been traced.

In order to prevent the sending of an additional impulse from the sub-station to the sending control relay 410 pulls over a circuit which may be traced as follows:

410 pulls: —, 410w, b410b, f405a, b411b, b412Ac, f408c, ⊕.
        b405c, ⊕.
410 holds: —, 410w, f410b, b411c, ⊕.

At the office, the sending control relay 310 drops due to the pulling of relay 305, relay 311 having previously been pulled.

Due to the pulling of the negative line relay 402 the negative sending relay 408 drops and, in turn, the negative line relays 402 and 302 drop. Positive battery is then applied to both terminals of the winding of the point lamp relay IC2 and it drops to extinguish the red indicating light 123 and to light the green indicating light 124. The circuit for applying the positive battery to the winding of the point lamp IC2 may be traced as follows:

IC2 drops: IC2w, f1B2d, b313a, f314a, b310a, b317, f306d, f304a, b303d, b301, b302, +.

The set may be restored to normal by operating the point operate key IPOK2 to its original position. The start relay 220 drops and in the manner described hereinbefore, a long positive impulse is transmitted by the positive sending relay 307 to restore the set to the normal condition.

Operation of point No. 3

In order to obtain an indication of the level of the water at the sub-station, the apparatus individual to point No. 3 is provided. This point is selected and checked by the code impulse combination individual thereto and as a result, the water level meter is connected first to read the percent of normal sub-station battery voltage and then to read the potentiometer voltage which is a function of the water level.

Selection of point No. 3

The operator operates the point operate key IPOK3 in order to select point No. 3 at both the office and the sub-station. As a result of the operation of the point operate key the start relay 220 pulls over a circuit which may be traced as follows:

220 pulls: —, 220w, IPOK3c, b220a, b313c, b314c, f309a, b311b, b305c, b310c, f306d, b301, b302, +.
220 holds: —, 220w, IPOK3c, f220a, +.

It will be recalled that the selection impulse for point No. 3 comprises a short positive impulse followed immediately by a short negative impulse. Therefore, the positive sending relay 307 is first pulled to transmit the positive impulse over a circuit which may be traced as follows:

307 pulls: —, 307w, b316c, b303b, IPOK3a, IPOK2b, IPOK1b, f220c, b313c, b314c, f309a, b311b, b305c, b310c, f306d, b301, b302, +.

Due to the pulling of the positive sending relay 307 the auxiliary sending relay 331 drops and positive line relays 301 and 401 pull over circuits which have previously been traced.

As a result of the pulling of the positive line relays 301 and 401 the positive and neutral receiving relays 303 and 305 at the office pull in series and relay 303 holds, while at the sub-station positive and neutral receiving relays 403 and 405 pull and relay 403 holds over circuits which have also previously been traced.

Negative sending relay 308 then pulls to pull the negative line relays 302 and 402 as soon as the positive line relays 301 and 401 have dropped. The circuit for pulling the negative sending relay 308 may be traced as follows:

308 pulls: —, 308w, b304d, f303b, IPOK3a, IPOK2b, IPOK1b, f220c, b313c, b314c, f309a, b331a, f307a, b308a, +.

It will be observed that the negative sending relay 308 holds over its own front contact members 308a which make before the back contact members break.

In order to prevent the sending of another impulse from the office, the sending control relay 310 pulls over a circuit which may.be traced as follows:

310 pulls: —, 310w, b310b, f305c, b311b, b331a, f308, +.
        b305a, ⊕.
310 holds: —, 310w, f310b, bIC3c, b311a, ⊕.

The positive sending relay 307 now drops due to the pulling of the positive line relay 301 and as a result the positive line relays 301 and 401 drop. Immediately the negative line relays 302 and 402 are pulled and as a result the negative receiving relays 304 and 404 pull in series, respectively, with the neutral receiving relays 305 and 405.

The negative sending relay 308 then drops due to the pulling of the negative line relay 302 and as a result the negative line relays 302 and 402 drop. The point equipment individual to point No. 3 at the office and the sub-station has then been selected and the point selection relays IB3 and 5F3 pull over circuits which may be traced as follows:

IB3 pulls: —, IB3w, b112c, f304c, f303d, b301, b302, +.
5F3 pulls: —, 5F3w, b412c, f404b, f403a, b401, b402, +.

Neutral receiving relays 305 and 405 then drop due to the dropping of the negative line relays 302 and 402 and as a result, the positive and negative receiving relays 303 and 304 at the office drop and the corresponding relays 403 and 404 at the sub-station drop.

At the office, the sending control relay 311 pulls over a circuit which may be traced as follows:

311 pulls: —, 311Pw, b305b, b1C3b, f310b, b1C3c, b305a, ⊕.

Relay 310 holds, however, over the back contacts of relay 305a.

Due to the dropping of the receiving relays 303 or 304, positive battery is removed from the winding of the point selection relay 1B3 and as a result, it is permitted to pull in series with the winding of the selection cut-off relay 112, which pulls in order to prevent any further selection over a circuit which may be traced as follows:

112 pulls: ⊕, 112w, f1B3b, 1B3w, —.

In like manner, at the sub-station, due to the dropping of the receiving relays 403 and 404, positive battery is removed from the winding of the point selection relay 5F3 and the winding of the selection cut-off relay 412 is energized in series to pull the relay 412 over a circuit which may be traced as follows:

412 pulls: ⊕, 412w, f5F3c, 5F3w, —.

*Check of selection of point No. 3*

The swithing relays 313 and 314 are now pulled in order to transfer the circuits to receive the check impulse which is transmitted from the sub-station to the office. These relays are pulled over circuits which may be traced as follows:

313 pulls: ⊕, b314b, 313w, f1B3b, 1B3w, —.
413 pulls: ⊕, b414c, 413w, f5F3c, 5F3w, —.

The check impulse which is transmitted from point No. 3 at the sub-station is the same as the selection impulse which was transmitted to select the point and therefore comprises a short positive impulse followed immediately by a short negative impulse. In order to transmit the check impulse the positive sending relay 407 pulls over a circuit which may be traced as follows:

407 pulls: —, 407w, b403c, f5F3a, f413b, b414b, f409b, b411b, b405a, b410a, f406a, b401, b402, +.

Auxiliary sending relay 412A drops due to the pulling of the positive sending relay 407 and as a result, the positive line relays 401 and 301 pull.

At the sub-station positive and neutral receiving relays 403 and 405 pull in series and relay 403 holds while at the office positive and neutral receiving relays 303 and 305 pull and relay 303 holds. Also at the office, sending control relay 310 drops due to the pulling of the neutral receiving relay 305 and because the sending control relay 311 had previously been pulled.

Negative sending relay 408 then pulls in order to transmit the negative impulse as soon as the sending of the positive impulse has been completed. This relay pulls over a circuit which may be traced as follows:

408 pulls: —, 408w, b404a, f403c, f5F3a, f413b, b414b, f409b, b412Ac, f407c, b408c, ⊕.

It will be observed that the negative sending relay 408 holds over its own front contacts 408c.

At the sub-station, sending control relay 410 pulls in order to prevent the sending of a subsequent impulse. Its pulling circuit may be traced as follows:

410 pulls: —, 410w, b410b, f405a, b411b, b412Ac, f408c, ⊕.

410 holds: —, 410w, f410b, b411c, ⊕.

Due to the pulling of the positive line relay 401 the positive sending relay 407 now drops and as a result the positive line relays 401 and 301 drop. Negative line relays 402 and 302 are then pulled and as a result, the negative receiving relays 404 and 304 pull in series, respectively, with the neutral receiving relays 405 and 305.

Due to the pulling of the negative line relay 402 the negative sending 408 drops and as a result, the auxiliary sending relay 412A pulls and the negative line relays 402 and 302 drop.

Circuits are then completed for pulling the check relays 414 and 314 over circuits which may be traced as follows:

414 pulls: —, 414w, f413c, f5F3b, f404b, f403b, b401, b402, +.
414 holds: —, 414w, f414c, ⊕.
314 pulls: —, 314w, f313b, f1B3e, f304c, f303d, b301, b302, +.
314 holds: —, 314w, f314b, ⊕.

The meter switching relay 1C3 is then pulled to connect the water level meter 135 to the signalling circuit. The circuit for pulling relay 1C3 is as follows:

1C3 pulls: —, 1C3w, f1B3c, f314b, ⊕.

Due to the dropping of the negative line relays 402 and 302 the neutral receiving relays 405 and 305 drop and in turn, the positive and negative receiving relays 403 and 404 at the sub-station and 303 and 304 at the office drop. Relay 411 at the sub-station then pulls in response to the dropping of the neutral receiving relay 405, and due to the pulling of the check relays 414 and 314, the switching relays 413 and 313 are dropped.

Point supervision relay 5G3 then pulls to connect the signalling circuit to the sub-station battery. Its pulling circuit may be traced as follows:

5G3 pulls: —, 5G3w, f5F3d, f411a, f406a, b401, b402, +.

At the office the stop lamp 130 lights to indicate to the operator that he has selected the proper point. The circuit for energizing the stop lamp 130 may be traced as follows:

Stop lamp lights: —, 130, f1B3a, b313b, f314b, ⊕.

The water level meter 135 is now connected to read the sub-station battery voltage. As has been set forth hereinbefore, this is desirable in order to obtain a true indication of the water level since the water level is measured in terms of the voltage across a potentiometer which, in turn, is connected across the sub-station battery. In order that the resistance of the line will not materially affect the reading of the water level meter 135, a resistance of approximately 36,000 ohms is connected in series with it so that the resistance of the line will be a small fraction of the total resistance in the circuit. The metering circuit for measuring the sub-station voltage may be traced as follows from the positive battery and the 18,000 ohm resistor located at the lower left-hand corner of Fig. 5 of the drawings:

Meter 135 indicates sub-station battery voltage: +, 18,000, f5G3a, b408b, b407b, line L2, b307b, b308b, 135, f1B3d, b218c, f1C3a, b308c, b307c, line L1, b407a, b408a, f5G3c, 18,000, b5H3c, b6H4c, 200, —.

The scale on the water level meter 135 is calibrated in percent, i. e., 100% indicates full battery voltage at the sub-station. Any percent reading less than this divided into the reading of the actual water level as indicated by a subsequent operation, will give the true water level reading.

Checking water level point No. 3

After the indication of the sub-station battery voltage has been obtained, the meter 135 is then switched to read the potentiometer voltage which corresponds to the water level. This switching operation is accomplished by operating the check key 2CK to pull the check control relay 219, the operation control relay 218 and the positive sending relay 307, in order to transmit a short positive impulse to the sub-station to effect the desired transfer. These relays pull over circuits which have been traced hereinbefore, and due to the pulling of relay 218, the circuit to the water level meter 135 is momentarily opened.

Due to the pulling of the positive sending relay 307 the auxiliary sending relay 331 drops and provides a holding circuit for relays 219 and 218, which has previously been traced. The positive line relays 301 and 401 then pull and at the office, positive and neutral receiving relays 303 and 305 pull and relay 303 holds, while at the sub-station, positive and neutral receiving relays 403 and 405 pull in series and relay 403 holds.

The meter switching relay 5H3 is now pulled in order to switch the signalling circuit from the battery voltage to the potentiometer voltage. The pulling circuit for this relay may be traced as follows:

5H3 pulls: ⊕, 5H3w, b5H3b, f5G3b, 5G3f, —.

Positive line relay 401 in pulling removes positive battery from the winding of the point supervision relay 5G3 and permits it to pull in series with the winding of relay 5H3.

5H3 holds: ⊕, 5H3w, f5H3b, 1000, —.

The point supervision relay 5G3 drops due to the pulling of the indicator switching relay 5H3 and the sending control relay 410 drops due to the neutral receiving relay 405 pulling.

At the office, sending control relay 310 pulls and holds over circuits which have previously been traced and due to the pulling of the positive line relay 301, the positive sending relay 307 drops. In turn, the positive receiving relays 301 and 401 drop and since the holding circuit for relays 218 and 219 is opened, they drop. Relay 310 also drops due to the dropping of relay 218.

At the sub-station, due to the dropping of the positive line relay 402, the point supervision relay 5G3 pulls over a circuit which has previously been traced.

A further result of the dropping of the positive line relays 301 and 401 is the dropping of the neutral receiving relays 305 and 405 and, in turn, the dropping of the positive receiving relays 303 and 403. At the sub-station relay 411 also drops due to the dropping of relay 305.

The water level meter 135 now reads the potentiometer voltage over the circuit which has been traced hereinbefore, except as follows:

Meter 135 indicates water level: previous circuit to 18,000, f5H3c, 530, —.

It will be understood that the pulling of the indicator switching relay 5H3 transferred the connection of the water level meter 135 from across the sub-station battery to across the potentiometer 530. The indication which is now given by the water level meter 135 is the voltage across the potentiometer which is a function of the water level.

After the indication of water level has been obtained, it may be held as long as is desired. When the operator wishes to release the set he restores the point operate key 1POK3 to the normal position and as a result, the start relay 220 drops. An extra long positive impulse is transmitted, as has been set forth hereinbefore in detail, to restore the set to the normal condition.

Operation of point No. 4

The apparatus associated with point No. 4 is provided for obtaining an indication of the position of the gate which controls the flow of water to the water turbine at the substation and further for controlling the position of the gate to either raise or lower it to either increase or decrease the flow of water. A detailed description will be set forth of the selecting and checking of point No. 4, the obtaining of an indication of the percentage of normal sub-station battery voltage, the transferring of the gate position meter to read the potentiometer voltage which corresponds to the gate position, the raising of the gate simultaneously with obtaining an indication of the movement of the gate at the office, and a subsequent lowering of the gate, together with a corresponding indication by the gate position meter at the office.

Selection of point No. 4

It will be assumed that the set is in the normal condition and that the operator has operated the point operated key 2POK4 in order to select point No. 4 at the office and at the sub-station. As a result of the operation of the point operate key the start relay 220 is pulled over a circuit which may be traced as follows:

220 pulls:—, 220w, 2POK4c, b220a, b313c, b314c, f309a, b311b, b305c, b310c, f306d, b301, b302, +.

220 holds: —, 220 w, 2POK4c, f220a, +.

It will be recalled that the selection code for point No. 4 is a short negative impulse. This is provided by the negative sending relay 308 which pulls over the following circuit:

308 pulls:—, 308w, b304d, 2POK4a, 1POK3b, 1POK2b, 1POK1b, f220c, b313c, b314c, f309a, b311b, b305c, b310c, f306d, b301, b302, +.

The auxiliary sending relay 331 drops due to relay 308 pulling and as a further result, the negative line relays 302 and 402 pull over circuits which may be traced as follows:

302 pulls:—, 200, b331c, f308c, b307c, 3500, b1C3a, 302w, 32R, b307b, f308b, +.

402 pulls:—, 200, b331c, f308c, b307c, line L1, b407a, b408a, b5G3c, b6G4c, 402w, 42R, line L2, b307b, f308b, +.

In response to the pulling of the negative line relays 301 and 302, the negative and neutral receiving relays 304 and 305 at the office, pull and relay 304 holds, while at the sub-station negative and neutral receiving relays 404 and 405 pull and relay 404 holds. Also at the office, sending control relay 310 pulls and holds over circuits which have previously been traced.

Due to the pulling of the negative line relay 302 the negative sending relay 308 drops pulling the auxiliary sending relay 331 and dropping the negative line relays 302 and 402.

The point selection has now been made and the point selection relays 2B4 and 6F4 pull over circuits which may be traced as follows:

2B4 pulls: —, 2B4w, b112d, f306a, f304a, b303d, b301, b302, +.

6F4 pulls: —, 6F4w, b412d, f406d, f404d, b403a, b401, b402, +.

The neutral receiving relays 305 and 405 now drop due to the dropping of the negative line relays 302 and 402 and as a further result, the negative receiving relays 304 and 304 drop.

Sending control relay 311 now pulls but relay 310 holds because the neutral receiving relay 305 has dropped before the sending control relay 311 pulled.

Due to the dropping of the negative receiving relay 304 positive battery is removed from the winding of the point selection relay 2B4 and as a result, the selection cut-off relay 112 is permitted to pull in series with the winding of the point selection relay 2B4 over a circuit which may be traced as follows:

112 pulls: ⊕, 112w, f2B4c, 2B4w, —.

In like manner at the sub-station positive battery is removed from the winding of the point selection relay 6F4 and it is permitted to pull in series with the winding of the selection cut-off relay 412 over a circuit which may be traced as follows:

412 pulls: ⊕, 412w, 6F4c, 6F4w, —.

*Check of selection point No. 4*

The switching relays 313 and 314 are now pulled to transfer the circuits to receive the check impulse. These relays pull over circuits which may be traced as follows:

313 pulls: ⊕, b314b, 313w, f2B4c, 2B4w, —.
413 pulls: ⊕, b414c, 413w, f6F4c, 6F4w, —.
Relay 311 holds: —, 311Hw, f313d, f311a, ⊕.

Point No. 4 at the office and the sub-station now having been selected, the check impulse is transmitted from the sub-station. This impulse comprises a long negative impulse which is transmitted by the negative sending relay 408. Its pulling circuit may be traced as follows:

408 pulls: —, 408w, f6F4a, f413b, b414b, f409b, b411b, b405a, b410a, b404d, b403a, b401, b402, +.

Auxiliary sending relay 412A drops in response to the pulling of the negative sending relay 408 and completes a holding circuit for the latter which may be traced as follows:

408 holds: —, 408w, f6F4a, f413b, b414b, f409b, b412Ac, f408c, ⊕.

In response to the pulling of the negative sending relay 408, the negative line relays 402 and 302 are pulled and, in turn, at the sub-station negative and neutral receiving relays 404 and 405 pull in series and relay 404 holds, while at the office, negative and neutral receiving relays 304 and 305 pull and relay 304 holds. Also at the sub-station sending control relay 410 pulls and holds to prevent the transmission of another impulse from the sub-station until one has been received from the office.

Since the negative sending relay 408 is held pulled for a long time, and as a result the negative line relays 302 and 402 are held pulled for a correspondingly long time, the long impulse receiving relays 406 and 306 drop. Due to the dropping of long impulse receiving relay 406, the long impulse sending relay 409 drops, thereby opening the holding circuit for the negative sending relay 408 and it drops. The dropping of negative sending relay 408 pulls the auxiliary sending relay 412A and drops the negative line relays 402 and 302.

Circuits are now completed for pulling the check relays 414 and 314 over circuits which may be traced as follows:

414 pulls: —, 414w, f413c, f6F4b, b406d, f404d, b403a, b401, b402, +.
414 holds: —, 414w, f414c, ⊕.
314 pulls: —, 314w, f313b, f2B4f, b306a, f304a, b303d, b301, b302, +.
314 holds: —, 314w, f314b, ⊕.

At the office the meter switching relay 103, which is common to both of the metering points 3 and 4, is pulled to connect the gate position meter 245 to the signalling circuit. Its pulling circuit may be traced as follows:

103 pulls: —, 103w, f2B4d, f414b, ⊕.

Neutral receiving relays 405 and 305 now drop due to their corresponding negative line relays 402 and 302 dropping and as a result, the negative receiving relays 404 and 304 drop. At the sub-station, relay 411 pulls due to the dropping of the neutral receiving relay 405.

The switching relays 413 and 313 drop due to the pulling of the check relays 414 and 314, respectively.

The long impulse receiving relays 406 and 306 are again pulled and held and at the sub-station, the long pulse sending relay 409 is pulled and held, all over circuits which have previously been traced. At the office, due to the dropping of the switching relay 313 the holding circuit for the sending control relay 311 is opened and it drops. At the sub-station the point supervision relay 6G4 pulls over a circuit which may be traced as follows:

6G4 pulls: —, 6G4w, f6F4d, f411a, f406a, b401, b402, +.

At this time, the stop lamp 240 individual to point No. 4 at the office, lights to indicate to the operator that the correct selection has been made. The circuit for energizing the stop lamp 240 may be traced as follows:

Stop lamp lights: —, 240, f2B4a, b313b, f314b, ⊕.

The gate position meter 245 now indicates the percentage of voltage of the sub-station battery relative to the full battery voltage. The circuit for the gate position meter 245 may be traced as follows beginning at the positive battery and the 18000 ohm resistor located at the lower left-hand corner of Fig. 5:

Meter 245 indicates sub-station battery voltage:
+ 18000, f6G4a, b408b, b407b, L2, b307b, b308b, 245, f2B4d, b218c, f1C3a, b308c, b307c, line L1, b401a, b408a, b5G3c, f6G4c, 18000, b5H3c, b6H4c, 200, —.

*Checking gate position point No. 4*

No further operation will take place and the gate position meter 245 will indicate the percent of normal sub-station battery voltage that exists until the operator depresses the check key 2CK in order to transfer the gate position meter 245 to read the potentiometer voltage. Therefore, the operator depresses the check key to effect the transfer of the gate position meter 245 to indicate the potentiometer voltage, and as a result, the check control relay 219 pulls. It, in turn, pulls the operation control relay 218 over circuits which have previously been traced. These relays hold over the front contacts of 218b and the circuit to the gate position meter 245 opens momentarily due to the pulling of relay 218. The impulse for switching from full scale to potentiometer voltage reading comprises a short positive impulse, and for this purpose, the positive sending relay 307 pulls over a circuit which has been traced hereinbefore.

As a result of the pulling of the positive sending relay 307, the auxiliary sending relay 331 drops to complete a holding circuit for relays 219 and 218, which has previously been traced.

In response to the pulling of the positive sending relay 307, positive line relays 301 and 401 are pulled. At the office, positive and neutral receiving relays 303 and 305 are pulled and relay 303 holds, while at the sub-station positive and neutral receiving relays 403 and 405 pull and relay 403 holds. At the office, sending control relay 310 pulls and holds while at the sub-station the sending control relay 411 holds over the front contacts 405b.

The pulling of the positive line relay 401 removed positive battery from the winding of the point supervision relay 6G4 and permits it to pull in series with the switching relay 6H4 over a circuit which may be traced as follows:

6H4 pulls: ⊕, 6H4w, b6H4b, f6G4b, 6G4w, —.
6H4 locks: ⊕, 6H4w, f6H4b, 1000, —.

The point supervision relay 6G4 then drops due to the indicator switching relay 6H4 pulling. Also, sending control relay 410 drops due to the pulling of the neutral receiving relay 405.

Due to the pulling of the positive line relay 301 the positive sending relay 307 now drops, pulling the auxiliary sending relay 331 and dropping the positive line relays 301 and 401. The holding circuit for relays 219 and 218 is now opened, due to the dropping of the positive sending relay 307, and they drop. The point supervision relay 6G4 again pulls due to the dropping of the positive line relay 401 over a circuit which has been traced hereinbefore.

The neutral receiving relays 305 and 405 drop due to the dropping of their corresponding positive line relays 301 and 401 and, in turn, the positive receiving relays 303 and 403 drop. At the sub-station, in response to the dropping of the neutral receiving relay 405, the sending control relay 411 also drops. Sending control relay 310 drops at the office due to the dropping of the operation control relay 218.

The gate position meter 245 now reads the voltage across the potentiometer 640 over the same circuit that has been traced hereinbefore, except as follows beginning at the 18000 ohm resistor shown directly underneath the indicator switching relay 5H3 as follows:

18000, f6H4c, 640, —.

By dividing the indication now obtained by the gate position meter from its connection across the potentiometer 640 by the percent reading of the previously obtained battery voltage, the true position of the gate may be obtained. As long as no further operation is initiated by the operator, the gate position meter 245 will continue to indicate the position of the gate and any change which takes place in it will, of course, be automatically indicated as it takes place.

*Raising the gate point No. 4*

It will be assumed that the operator wishes to raise the gate in order to increase the flow of water to the water turbine at the sub-station. He, therefore, operates the twist key 2TK4 to the alternate position from that shown in the drawings, and then operates the master control key 2MCK. In response to the operation of the master control key the operation control relay 218 pulls over a circuit which may be traced as follows:

218 pulls: —, 218w, 2MCKa, f220b, f314c, f309a, b311b, b305c, b310c, f306d, b301, b302, +.

It will be recalled that the "raise" operation is initiated by the application of a short positive impulse to the signalling circuit followed by a short negative impulse. In order to apply the positive impulse, the positive sending relay 307 is pulled over a circuit which may be traced as follows:

307 pulls: —, 307w, b316c, b303b, 2TK4b, f2B4b, b219a, f218b, f220b, f314c, f309a, b311b, b305c, b310c, f306d, b301, b302, +.

Due to the pulling of the positive sending relay 307 the auxiliary sending relay 331 drops and completes a holding circuit for the operation control relay 218 which has been traced hereinbefore. As a further result of the pulling of the positive sending relay 307 the positive line relays 301 and 401 are pulled. At the office, the positive and neutral receiving relays 303 and 305 are pulled and relay 303 holds, while at the sub-station, the positive and neutral receiving relays 403 and 405 pull and relay 403 holds. It will be observed that the circuit to the gate position meter 245 is opened, during the subsequent operations, but it will be restored to indicate the change of the gate position as it takes place.

At the sub-station the point supervision relay 6G4 drops due to the pulling of the positive line relay 401. At the office the sending control relay 310 pulls and holds.

In order to transmit the succeeding negative impulse the negative sending relay 308 pulls over a circuit which may be traced as follows:

308 pulls: —, 308w, b304d, f303b, 2TK4b, f2B4b, b219a, f218b, f220b, f314c, f309a, b331a, f307a, b308a, ⊕.

It will be observed that the negative sending relay 308 holds over its own front contacts 308a.

Due to the pulling of the positive line relay 301 the positive sending relay 307 drops. However, the operation control relay 218 holds over the front contacts 308a. As a result of the dropping of the positive sending relay 307 the positive line relays 301 and 401 drop and immediately the negative line relays 302 and 402 pull, pulling negative receiving relays 304 and 404 in series with their respective neutral receiving relays 305 and 405.

The negative sending relay 308 now drops due to the negative line relay 302 pulling, and as a result, the negative line relays 302 and 402 drop. A further result of the dropping of the negative sending relay 308 is to open the holding circuit for the operation control relay 218 which, in turn, opens the holding circuit for the sending control relay 310 and it drops. The point supervision relay 6G4 which has dropped, due to the pulling of the line relays at the sub-station again pulls over a circuit which has been traced hereinbefore.

The raise relay 6R4 now pulls and completes at contact members f6R4b a circuit, not shown, for initiating the raise operation mechanism which is arranged to control the position of the gate. The circuit for pulling the raise relay may be traced as follows:

6R4 pulls: —, 411Hw, b413a, f414a, b410c, f6F4e, 6R4w, f404b, f403a, b401, b402, +.
6R4 holds: —, 411Hw, b413a, f414a, b410c, f6F4e, 6R4w, f6R4a, b401, b402, +.

Neutral receiving relays 305 and 405 now drop due to the dropping of the negative line relays 302 and 402, and in turn, the positive receiving relays 303 and 304 at the office and receiving relays 403 and 404 at the sub-station drop. It will then be observed that the circuit to the gate position meter 245 is again restored and as the contact member of the potentiometer 640 moves in response to the raising of the gate, a corresponding indication will be given by the gate position meter. It will be readily appreciated that this is highly advantageous since the operator can in effect observe the movement of the gate and arrest further movement when he is satisfied with the gate opening.

*To stop gate from further raising, point No. 4*

In order to stop the gate from raising any further, it is necessary to drop the raise relay 6R4. It will be observed that the circuit for holding this relay is completed through the back contacts of the positive line relay 401. Therefore, it is only necessary to apply a short positive impulse to the signalling circuit to pull the positive line relay 401 and the raise relay 6R4 will be immediately dropped.

In order to stop any further raising of the gate the operator depresses the check key 2CK and as a result, the check control relay 219 pulls, pulling the operation control relay 218 over circuits which have been traced hereinbefore. The circuit to the gate position meter 245 is open temporarily but will be restored as soon as the succeeding operations to stop further raising of the gate has been completed.

As set forth, a short positive impulse is transmitted to the sub-station in order to drop the raising relay 6R4. This impulse is transmitted by the pulling of the positive sending relay 307 over a circuit which has been traced hereinbefore. The auxiliary sending relay 331 drops and completes a holding circuit for the relays 219 and 218. In addition, the positive line relays 301 and 401 are pulled. At the office, positive and neutral receiving relays 303 and 305 pull and relay 303 holds, while at the sub-station, positive and neutral receiving relays 403 and 405 pull and relay 403 holds. Due to the pulling of the positive line relay 401 the point supervision relay 6G4 drops and also the raise relay 6R4. The gate operating mechanism is then deenergized and no further movement of the gate takes place.

At the office, the sending control relay 310 pulls and holds. The positive sending relay 307 drops due to the pulling of the positive line relay 301, and as a result, the auxiliary sending relay 331 pulls. Due to the dropping of the positive sending relay 307 the positive line relays 301 and 401 drop. Since the holding circuit for the relays 219 and 218 has been opened, they drop and at the sub-station, the point supervision relay 6G4 again pulls over a circuit which has been traced hereinbefore.

It will now be observed that the circuit to the gate position meter 245 has again been completed and it now gives an indication of the final position of the gate. Thus it has not been necessary to re-select the point in order to obtain final indication of the gate position, but rather the gate position is indicated while the same point remains selected and over which operations for moving the gate have been initiated.

Due to the dropping of the operation control relay 218 the sending control relay 310 drops. Further due to the dropping of the positive line relays 301 and 401 the neutral receiving relays 305 and 405 drop and, in turn, the positive receiving relays 303 and 403 drop.

*To lower the gate point No. 4*

In the event that the operator finds, on obtaining the position of the gate, that it is open too far he may lower it to reduce the flow of water to the water turbine. In order to do this, he operates the twist key 1TK4 to the position illustrated in the drawings, and depresses the master control key 2MCK. As a result the operation control relay 218 pulls over a circuit which has been traced hereinbefore.

It will be recalled that a long positive impulse is transmitted over the signalling circuit to initiate the "lower" operation. In order to apply this impulse to the signalling circuit the positive sending relay 307 is pulled over a circuit which may be traced as follows:

307 pulls: —, 307w, b316c, 2TK4a, f2B4b, b219a, f218b, f220b, f314c, f309a, b311b, b305c, b310c, f306d, b301, b302, +.

Due to the pulling of the positive sending relay 307 the auxiliary sending relay 331 drops and completes a circuit for holding the operation control relay 218 which has been traced hereinbefore. This same holding circuit also holds the positive sending relay 307 pulled to provide the long positive impulse which is required for initiating the "lower" operation.

As a result of the pulling of the positive sending relay 307 the positive line relays 301 and 401 are pulled. At the office the positive and neutral receiving relays 303 and 305 are pulled and relay 303 holds, while at the sub-station, the positive and neutral receiving relays 403 and 405 pull and relay 403 holds. Due to the pulling of the positive line relay 401 the point supervision relay 6G4 drops. At the office sending control relay 310 pulls and holds.

Due to the fact that the positive line relays 301 and 401 are pulled for an extra long time, the long impulse receiving relays 306 and 406 are dropped. Due to the auxiliary sending relay 331 being dropped for an extra long time, the long impulse sending relay 309 drops, thereby opening the holding circuit for the positive sending relay 307 and it drops, pulling the auxiliary sending relay 331. Due to the dropping of the positive sending relay 301 the positive line relays 301 and 401 drop. The holding circuit for the operation control relay 218 is opened and it drops, dropping the sending control relay 310. At the sub-station the point supervision relay 6G4 pulls due to the dropping of the positive line relay 401 over a circuit which has previously been traced.

The lower relay 6L4 now pulls to initiate the lower operation at contact members f6L4b. Its pulling circuit may be traced as follows:

6L4 pulls: —, 411Hw, b413a, f414a, b410c, f6F4f, 6L4w, b406c, b404b, f403a, b401, b402, +.

6L4 holds: —, 411Hw, b413a, f414a, b410c, f6F4f, 6L4w, f6L4a, b401, b402, +.

The gate operating mechanism now functions to lower the gate and continues to do so as long as the lower relay 6L4 remains pulled. It will be observed, however, that the circuit to the gate position meter 245 has again been completed and the operator can observe the movement of the gate as it is lowered.

Due to the dropping of the positive line relays 301 and 401 the neutral receiving relays 305 and 405 are dropped and, in turn, the positive receiving relays 303 and 403 are dropped. At the office, the long impulse receiving relay 306 pulls and holds and, in turn, the long impulse sending relay 309 pulls and holds over circuits which have previously been traced. In like manner, at the sub-station the long impulse receiving relay 406 pulls and holds.

When the operator desires to stop the gate from lowering further, he depresses the check key 2CK to transmit to the sub-station a short positive impulse to pull the positive line relay 401 and thereby open at its back contact members the holding circuit for the lower relay 6L4. Since the functioning of the system to accomplish the stopping of the further lowering operation is identical with that set forth hereinbefore in stopping any further raise operation, it will not be set forth again. It will be noted, however, that as soon as the lowering operation has ceased the gate position meter 245 is again connected to indicate the final position of the gate. The raising and lowering operations may be repeated as many times as desired before resetting the system to normal.

The set may then be restored to normal by returning the point operate key 2POK4 to the normal position. The sequence of operations which takes place for restoring the set to normal has previously been described and will not again be set forth.

*Operation on point No. 5*

In describing the operation on point No. 5 it will be assumed that the circuit breaker associated with this point at the sub-station is in the closed position, that the point lamp relay 2C5 is pulled, and that the red indicating light 253 is lighted. Under these conditions, the following relays will be pulled at the office: 306, 309, 315, 329, 331 and 2C5. At the sub-station the following relays will be pulled: 406, 409, 415, 411A, 412A, 6G5, 5H1, 5H2, and 6H5. It will be assumed that the breaker associated with point No. 5 at the sub-station trips. As a result of the tripping of the circuit breaker, the auxiliary switch 6AS5 opens and the point supervision relay 6G5 drops, dropping the point start relay 6H5.

*Selection of point No. 5*

Since the impulse for selecting point No. 5 is a long negative impulse, the negative sending relay 408 at the sub-station is pulled to transmit this impulse. The circuit for pulling this relay may be traced as follows:

408 pulls: —, 408w, b6H5b, f5H2b, f5H1b, b413b, b414b, f409b, b411b, b405a, b410a, f406a, b401, b402, +.

The auxiliary sending relay 412A drops due to the pulling of the negative sending relay 408 and completes a circuit for holding relay 408 as follows:

408 holds: —, 408w, b6H5b, f5H2b, f5H1b, b413b, b414b, f409b, b412Ac, f408c, ⊕.

As a result of the pulling of the negative sending relay 408 the negative receiving relays 402 and 302 pull. At the sub-station negative and neutral receiving relays 404 and 405 pull and relay 404 holds, while at the office, negative and neutral receiving relays 304 and 305 pull and relay 304 holds. Sending control relay 410 pulls and holds over a circuit which has previously been traced.

Due to the fact that the negative line relays 402 and 403 are pulled for an extra long time, the long impulse receiving relays 406 and 306 drop. Further, due to the fact that the auxiliary sending relay 412A is dropped for an extra long time, the long impulse sending relay 409 is dropped and it, in turn, opens the holding circuit for the negative sending relay 408. The auxiliary sending relay 412A then pulls and the negative line relays 402 and 302 drop as the result of the dropping of the negative sending relay 408. Point No. 5 is now selected at both the sub-station and the office and the point selection relays 6F5 and 2B5 pull over circuits which may be traced as follows:

6F5 pulls: —, 6F5w, b412e, b406d, f404d, b403a, b401, b402, +.

2B5 pulls: —, 2B5w, b112e, b306a, f304a, b303d, b301, b302, +.

The neutral receiving relays 405 and 305 now drop due to their corresponding negative line relays 402 and 302 dropping and, in turn, the negative receiving relays 404 and 304 drop. Long impulse receiving relay 406 and long impulse sending relay 409 pull and hold over circuits which have been traced hereinbefore. At the office, the long impulse relay 306 pulls and holds. Also at the sub-station the sending control relay 411 pulls over a circuit which has previously been traced.

The dropping of relay 404 removes positive battery from the winding of the point selection relay 6F5 and permits it to pull in series with the selection cut-off relay 412 to prevent any further selection while operating on this point. The circuit for pulling relay 412 may be traced as follows:

412 pulls: ⊕, 412w, f6F5c, 6F5w, —.

In like manner, at the office the dropping of relay 304 removes the positive battery from the point selection relay 2B5 and permits it to pull in series with the selection cut-off relay 112 over a circuit which may be traced as follows:

112 pulls: ⊕, 112w, f2B5c, 2B5w, —.

*Check of selection point No. 5*

In order to insure that the proper selection of the point at the office has been made a selection sequence similar to that previously described in connection with the selection of a point from the office takes place. The circuits are transferred to the selecting condition by the pulling of the switching relays 413 and 313 over circuits which may be traced as follows:

413 pulls: ⊕, b414c, 413w, f6F5c, 6F5w, —.
313 pulls: ⊕, b314b, 313w, f2B5c, 2B5w, —.

At the sub-station the sending control relay 411 holds over a circuit which may be traced as follows:

411 holds: —, 411Hw, f413a, 200, f411c, ⊕.

The check impulse for point No. 5 comprises a short negative impulse which is applied to the signalling circuit by the negative sending relay 308. This relay is pulled over a circuit which may be traced as follows:

308 pulls: —, 308w, b304d, f2B5d, f313c, b314c, f309a, b311b, b305c, b310c, f306d, b301, b302, +.

Auxiliary sending relay 331 drops in response to the pulling of the negative sending relay 308 and completes a circuit for pulling the check control relay 219 to complete a circuit for lighting the alarm lamp 2AL. The circuit for pulling relay 219 is as follows:

219 pulls: —, 219Rw, b220d, b219c, f313c, b314c, f309a, b331a, f308a, +.

219 holds: —, 219Rw, b220d, f219c, 2RKb, +.

The alarm light 2AL then lights and remains lighted until the operator performs an operation to acknowledge that he has received the signal from the sub-station indicating that an apparatus unit has changed its position at the sub-station.

In response to the pulling of the negative sending relay 308, the negative line relays 302 and 402 are pulled. At the office negative and neutral receiving relays 304 and 305 pull and relay 304 holds, while at the sub-station, negative and neutral receiving relays 404 and 405 pull and relay 404 holds. Also at the office, sending control relay 310 pulls and holds and at the sub-station the sending control relay 410 drops, due to relay 405 pulling.

The negative sending relay 308 now drops due to the pulling of the negative line relay 302 and as a result the auxiliary sending relay 331 pulls. The negative line relays 302 and 402 drop due to the dropping of the negative sending relay 308. Circuits are now completed for pulling the check relays 314 and 414 which may be traced as follows:

314 pulls: —, 314w, f313b, f2B5f, f306a, f304a, b303d, b301, b302, +.

314 holds: —, 314w, f314b, ⊕.

414 pulls: —, 414w, f413c, f6F5b, f406d, f404d, b403a, b401, b402, +.

414 holds: —, 414w, f414c, ⊕.

Due to the dropping of the negative line relays 302 and 402 the neutral receiving relays 305 and 405 drop, and as a result, the negative receiving relays 304 and 404 drop. At the office, sending control relay 311 pulls and at the sub-station, the holding circuit for the sending control relay 411 is opened due to the dropping of relay 413 and it drops.

The stop light 250 at the office is lighted over a circuit which may be traced as follows:

Stop light 250: —, 250, f2B5a, b313b, f314b, ⊕.

*Supervision of circuit breaker position*

Since the circuit breaker associated with point No. 5 is in the tripped position, a supervision impulse corresponding to this position is transmitted from the sub-station to the office to drop the point lamp relay 2C5 for the purpose of extinguishing the red indicating light and lighting the green indicating light. It will be recalled that this supervision impulse is a short negative impulse. This is transmitted to the office on the pulling of the negative sending relay 408 over a circuit which may be traced as follows:

408 pulls: —, 408w, b404a, b6G5a, f6F5d, f414b, f409b, b411b, b405a, f410a, f406a, b401, b402, +.

The auxiliary sending relay 412A drops and the negative line relays 402 and 302 pull. In turn, the negative and neutral receiving relays 404 and 405 at the sub-station pull in series, and at the office the negative and neutral receiving relays 304 and 305 pull in series. The negative receiving relays 404 and 304 hold over circuits which have previously been traced. At the sub-station, the sending control relay 410 pulls and holds over circuits which have previously been traced, and at the office, the sending control relay 310 drops.

Due to the pulling of the negative receiving relay 404 the pulling circuit for the negative sending relay 408 is opened and it drops, pulling the auxiliary sending relay 412A.

The negative receiving relays 402 and 302 then drop due to the dropping of the negative sending relay 408. As a result of the dropping of the negative receiving relay 302 at the office, positive battery is applied to both sides of the winding of the point lamp relay 2C5 and it drops. The circuit for applying the positive battery to the winding of the point lamp relay 2C5 may be traced as follows:

2C5 drops: 2C5w, f2B5e, b313a, f314a, b310a, b317, f306a, f304a, b303d, b301, b302, +.

As the result of the dropping of the point lamp relay 2C5, the red indicating lamp 253 is extinguished and the green indicating lamp 254 is lighted.

Due to the dropping of the negative line relays 402 and 302 the neutral receiving relays 405 and 305 drop and as a result, the negative receiving relays 404 and 304 drop. At the office, the sending control relay 311 drops due to the fact that its holding circuit has been opened.

The set is automatically released by the pulling of the release control relay 316 over a circuit which may be traced as follows:

316 pulls: —, 316w, b316a, b220b, f314c, f309a, b311b, b305c, b310c, f306d, b301, b302, +.

316 holds: —, 316w, f316a, f315a, +.

An extra long positive release impulse is then transmitted to the sub-station and the set is restored to normal in the manner set forth in connection with the description of the operation of point No. 1.

Due to the fact that the twist key 2TK5 is now in a position which does not correspond to the position of the apparatus unit associated with it at the sub-station, the disagreement lamp flicker relays alternately pull, as set forth hereinbefore, to flash the disagreement lamp 251. The operator then operates the twist key 2TK5 to the tripped position and the disagreement lamp 251 is no longer flashed. He then depresses the reset key 2RK, which extinguishes the alarm light 2AL and opens the holding circuit for the check control relay 219 which then drops. The set is now in condition for the initiation of an operation either at the office or at the sub-station.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. A supervisory control system comprising, in combination, a first station, a second station, a single signalling circuit connecting the stations, a plurality of control points at the first station, a plurality of controllable points at the second station each individual to a control point at the first station, polarized relay means at each station disposed to be selectively operated on the application of short or long positive or negative impulses or a combination positive and negative impulse to said signalling circuit, transmitting relay means at each station disposed to apply short or long, positive or negative impulses or a combination positive and negative impulse to said signalling circuit for selectively pulling said polarized relay means for different time intervals, and receiver means responsive to the selective operation of said polarized relay means for predetermined time intervals for selecting predetermined corresponding points at each station.

2. A supervisory control system comprising, in combination, a first station, a second station, a single signalling circuit connecting the stations, five control points at the first station, five controllable points at the second station each individual to a control point, positive and negative transmitting relays at the first station disposed to apply corresponding impulses to said signalling circuit, a pair of polarized relays at the second station disposed to be oppositely connected to said signalling circuit, means individual to each point at the first station for pulling one or the other of said transmitting relays for either a short or a long interval or for pulling them in immediate sequence to correspondingly pull the polarized relays at the second station, and relay means at the second station responsive to the individual manner of pulling of said polarized relays for selecting the point corresponding to the impulse transmitted from the first station.

3. A supervisory control system comprising, in combination, a first station, a second station, a single signalling circuit connecting the stations, five control points at the first station, five controllable points at the second station, each individual to a control point, positive and negative transmitting relays at the first station disposed to apply corresponding impulses to said signalling circuit, circuit means individual to two of the control points for pulling either the positive or the negative transmitting relay for a short interval, circuit means individual to two other control points for pulling either the positive or the negative transmitting relay for a long interval, circuit means individual to one other control point for pulling the transmitting relays in immediate sequence, a pair of polarized relays at the second station disposed to be oppositely connected to said signalling circuit and to be pulled in accordance with the impulses applied thereto by said transmitting relays, a point selection relay individual to each controllable point, circuit means individual to two of the controllable points for pulling either of the point selection relays individual thereto in response to the pulling of either of said polarized relays for a short interval, circuit means individual to two other controllable points for pulling either of the point selection relays individual thereto in response to the pulling of either of said polarized relays for a long interval, and circuit means individual to one other controllable point for pulling the point selection relay individual thereto in response to the pulling of said polarized relays in immediate sequence.

4. A supervisory control system comprising, in combination, a first station, a second station, a single signalling circuit connecting the stations, five control points at the first station, five controllable points at the second station each individual to a control point, positive and negative transmitting relays at each station disposed to apply corresponding impulses to said signalling circuit, a pair of polarized relays at each station disposed to be oppositely connected to said signalling circuit, means individual to each point at each station for pulling one or the other of said transmitting relays at the corresponding station for either a short or a long interval or for pulling them in immediate sequence to correspondingly pull the polarized relays at both stations, and relay means responsive to the individual manner of pulling of said polarized relays for selecting corresponding points at both stations in response to the transmission from either station to the other station of an impulse individual to the point selected.

5. A supervisory control system comprising, in combination, a first station, a second station, a single signalling circuit connecting the stations, five control points at the first station, five controllable points at the second station each individual to a control point, positive and negative transmitting relays at each station disposed to apply corresponding impulses to said signalling circuit, a pair of polarized relays at each station disposed to be oppositely connected to said signalling circuit, means individual to each point at each station for pulling one or the other of said transmitting relays at the corresponding station for either a short or a long interval or for pulling them in immediate sequence to correspondingly pull the polarized relay at both stations, relay means responsive to the individual manner of pulling of said polarized relays for selecting corresponding points at both stations in response to the transmission from either station to the other station of an impulse individual to the point selected, means at the first station responsive to the selection of the control point thereat for conditioning the station to receive a check impulse, means responsive to the selection of a controllable point at the second station for conditioning the station to transmit a check impulse and for initiating the functioning of the transmitting relays at the second station to transmit to the first station a timed check impulse individual to the point selected, and means responsive to the functioning of the polarized relays at the first station in response to said check impulse for indicating that the proper selection has been made at the second station.

6. A supervisory control system comprising, in combination, a first station, a second station, a single signalling circuit connecting the stations, five control points at the first station, five controllable points at the second station each individual to a control point, positive and negative transmitting relays at each station disposed to apply corresponding impulses to said signalling circuit, circuit means at each station individual to two of the control points ofr pulling either the positive or the negative transmitting relay for a short interval, circuit means at each station individual to two other control points for pulling either the positive or the negative transmitting relays for a long interval, circuit means at each station individual to one other control point for pulling the transmitting relays in immediate sequence, a pair of polarized relays at each station disposed to be oppositely connected to said signalling circuit and to be pulled in accordance with the impulses applied thereto by said transmitting relays, a point selection relay individual to each point at each station, circuit means at each station individual to two of the corresponding control and controllable points for pulling either of the point selection relays individual thereto in response to the pulling of either of the polarized relays at the first and second stations for a short interval, circuit means at each station individual to two other corresponding control and controllable points for pulling either of the point selection relays individual thereto in response to the pulling of either of the polarized relays at the first and second stations for a long interval, and circuit means at each station individual to one other corresponding control and controllable point for pulling the point selection relay individual thereto in response to the pulling of said polarized relays at the first and second second stations in immediate sequence.

7. A supervisory control system comprising, in combination, a first station, a second station, a single signalling circuit connecting the stations, five control points at the first station, five controllable points at the second station each individual to a control point, positive and negative transmitting relays at the first station disposed to apply corresponding impulses to said signalling circuit, a pair of polarized relays at the second station disposed to be oppositely connected to said signalling circuit, means individual to each point at the first station for pulling one or the other of said transmitting relays for either a short or a long interval or for pulling them in immediate sequence to correspondingly pull the polarized relays at the second station, receiving relay means at the second station responsive to the individual manner of pulling of said polarized relays for selecting the point corresponding to the impulse transmitted from the first station.

8. A supervisory control system comprising first and second stations connected by a single signalling circuit, a plurality of corresponding control and controllable points at the first and second stations respectively, transmitter means at the first station operable to selectively transmit single short or long positive or negative impulses and two successive short impulses of opposite polarity individual to the corresponding points over the signalling circuit to the second station, and receiver means at the second station selectively responsive to the polarity and length of said impulses for selecting a controllable point thereat individual to the impulse transmitted.

9. A supervisory control system comprising first and second stations connected by a single signalling circuit, a plurality of corresponding control and controllable points at the first and second stations respectively, transmitter means at the first station operable to selectively transmit single short or long positive or negative impulses and two successive short impulses of opposite polarity individual to the corresponding points over the signalling circuit to the second station, positive and negative polarized relays connected to the signalling circuit at the second station selectively responsive to the polarity and length of the said impulses transmitted, and means including receiving relays responsive to the selective operation of said polarized relays for selecting a controllable point individual to the character of the impulse transmitted.

10. In a supervisory control system, in combination, first and second stations connected by a single signalling circuit, a combined control and metering point at the first station, an indicating meter at said point disposed to be connected to the signalling circuit, a metering point at the second station, a voltage source at the second station, a potentiometer energized from said source and actuated in accordance with a changing condition, a transmitter and a receiver at each station, means including the transmitters and receivers at both stations and the signalling circuit for selecting said points at both stations and checking the selection at the first station, means at both stations operable following the checking operation for connecting the indicating meter and the voltage source to the opposite ends of the signalling circuit thereby to indicate the voltage of said source at the first station, means at the first station for operating the transmitter thereat to operate the receiver at the second station, and means at the second station responsive to said operation of the receiver thereat for disconnecting the voltage source from and connecting the potentiometer to the signalling circuit, thereby to indicate the potentiometer voltage at the first station.

11. A supervisory control system comprising first and second stations connected by a single signalling circuit, a control point at the first station, a controlled point at the second station, an indicating meter associated with the control point at the first station, a source of voltage at the second station, a potentiometer associated with the controlled point at the second station disposed to be energized from said source of voltage and operable in accordance with a changing condition to produce a voltage in accordance with said condition, transmitter means at each station operable to transmit timed impulses over the signalling circuit, receiver means at each station selectively responsive to said impulses, means at the first station for operating the transmitter means thereat to operate the receiver at the second station to select the controlled point, means at the second station responsive to said selection for operating the transmitter means thereat to operate the receiver means at the first station to check the selection, means at the first station responsive to the operation of the receiver thereat for connecting the indicating meter to the signalling circuit, means at the second station operative following the operation of the transmitter means thereat for connecting the source of voltage to the signalling circuit thereby to indicate the voltage at the first station, means at the first station for operating the transmitter means thereat to operate the receiver means at the second station, and means at the second station responsive to the receiver means thereat for connecting the potentiometer to the signalling circuit thereby to transmit a voltage to the indicating means at the first station in accordance with the changing condition.

12. A supervisory control system comprising first and second stations connected by a single signalling circuit, a control point at the first station, a controlled point at the second station, an indicating meter associated with the control point at the first station, a source of voltage at the second station, a potentiometer associated with the controlled point at the second station disposed to be energized from said source of voltage and operable in accordance with a changing condition to produce a voltage in accordance with said condition, transmitter means at each station operable to transmit timed impulses over the signalling circuit, receiver means at each station selectively responsive to said impulses, means at the first station for operating the transmitter means thereat to operate the receiver at the second station to select the controlled point, means at the second station responsive to said selection for operating the transmitter means thereat to operate the receiver means at the first station to check the selection, means at the first station responsive to the operation of the receiver thereat for connecting the indicating meter to the signalling circuit, means at the second station operative following the operation of the transmitter means thereat for connecting the source of voltage to the signalling circuit thereby to indicate the voltage at the first station, means at the first station for operating the transmitter means thereat to operate the receiver means at the second station, means at the second station responsive to the operation of the receiver means thereat for connecting the potentiometer to the signalling circuit, means at the first station for operating the transmitter means thereat to operate the receiver at the second station, means responsive to the operation of the receiver at the second station for initiating a change in said condition, said potentiometer being operated to transmit a voltage over the signalling circuit to the indicating meter at the first station to provide a continuous indication of the changing condition.

13. In a supervisory control system, in combination, a first station, a second station, a single signalling circuit connecting said stations, a plurality of control points at the first station including a combined control and metering point, a plurality of controllable points at the second station including a combined control and metering point, transmitting means at each station operable to selectively transmit timed impulses over the signalling circuit to the other station, receiver means at each station selectively responsive to the transmission of said impulses from the other station, means at the first station including the transmitting means thereat for selectively operating the receiver means at both stations to select corresponding points at both stations, means at each station responsive to the operation of the receiver thereat for conditioning the receiver at the first station to receive a check impulse and the transmitter at the second station to transmit a check impulse, means responsive to a point selection at the second station for operating the transmitting means thereat to transmit a check impulse individual to the selected point over said signalling circuit to selectively operate the receiver means at both stations, means at the first station responsive to the operation of the receiver means thereat for indicating if the point selection made at the second station compares with the point selection made at the first station, an indicating meter at the first station, a voltage source at the second station, a potentiometer at the second station disposed to be connected across the voltage source and operated in accordance with a changing condition, means at the second station for initiating a changing condition thereat, means at the first station responsive to the operation of the receiver thereat in response to a check impulse individual to the combined control and metering point at the second station for also connecting the indicating meter to the signalling circuit, means at the second station responsive to the operation of the receiver means thereat in the transmission of the check impulse for connecting the voltage source to the signalling circuit thereby to indicate said voltage at the first station, means at the first station for again operating the transmitter means thereat to operate the receiver means at the second station, and means responsive to the receiver means at the second station for disconnecting the voltage source and connecting the potentiometer to the signalling circuit.

14. In a supervisory control system, in combination, a first station, a second station, a single signalling circuit connecting said stations, a plurality of control points at the first station including a combined control and metering point, a plurality of controllable points at the second station including a combined control and metering point, transmitting means at each station operable to selectively transmit timed impulses over the signalling circuit to the other station, receiver means at each station selectively responsive to the transmission of said impulses from the other station, means at the first station including the transmitting means thereat for selectively operating the receiver means at both stations to select corresponding points at both stations, means at each station responsive to the operation of the receiver thereat for conditioning the receiver at the first station to receive a check impulse and the transmitter at the second station to transmit a check impulse, means responsive to a point selection at the second station for operating the transmitting means thereat to transmit a check impulse individual to the selected point over said signalling circuit to selectively operate the receiver means at both stations, means at the first station responsive to the operation of the receiver means thereat for indicating if the point selection made at the second station compares with the point selection made at the first station, an indicating meter at the first station, a voltage source at the second station, a potentiometer at the second station disposed to be connected across the voltage source and operated in accordance with a changing condition, means at the second station for initiating a changing condition thereat, means at the first station responsive to the operation of the receiver thereat in response to a check impulse individual to the combined control and metering point at the second station for also connecting the indicating meter to the signalling circuit, means at the second station responsive to the operation of the receiver means thereat in the transmission of the check impulse for connecting the voltage source to the signalling circuit thereby to indicate said voltage at the first station, means at the first station for again operating the transmitter means thereat to operate the receiver means at the second station, and means responsive to the receiver means at the second station for disconnecting the voltage source and connecting the potentiometer to the signalling circuit and means at the first station for again operating the transmitter means thereat to operate the receiver means at the second station, means responsive to said operation of the receiver means at the second station for operating the means thereat for initiating a change in the condition, said potentiometer and indicating means thereafter functioning to indicate the changing condition.

15. A supervisory control system comprising, in combination, a first station, a second station, a single signalling circuit connecting said stations, a plurality of control points at the first station, a plurality of control points at the second station each individual to a control point at the first station, transmitter means at each station responsive to an operation at the station for transmitting to the other station over said single signalling circuit a short or long, positive or negative impulse or two impulses of opposite polarity individual to each pair of corresponding control points, and receiver means at each station selectively responsive to said impulses transmitted over said single signalling line to selectively perform an operation at said corresponding control points individual to the impulse or impulses transmitted.

16. A supervisory control system comprising, in combination, a first station, a second station, a single signalling circuit connecting the stations, a plurality of control points at the first station, a plurality of controllable points at the second station each individual to a control point at the first station, transmitter means at each station responsive to an operation at the station for transmitting to the other station over said single signalling channel a timed selection impulse comprising a short or long, positive or negative impulse or a direct-current impulse followed immediately by a direct-current impulse of opposite polarity individual to a control or controllable point, receiver means at each station selectively responsive to said impulses transmitted over said signalling line to select at each station a corresponding pair of corresponding points individual to the impulse or impulses transmitted, means at each station responsive to a selection thereat in response to the transmission of a selection impulse from the other station for switching the receiving station to a transmitting condition, means at each station responsive to the operation of the transmitter means thereat for switching the station to a receiving condition, means at each station operable in response to a selector thereat and the following switching operation for operating the transmitting means thereat to transmit from the station not originating the selection impulse to the other station a check impulse comprising a short or long, positive or negative impulse or a direct-current impulse followed immediately by a direct-current impulse of opposite polarity, and means at each station including the receiving means thereat operable in response to the reception of the correct check impulse for checking the selection.

17. A supervisory control system comprising, in combination, a first station, a second station, a single signalling circuit connecting the stations, a plurality of control points at the first station, a plurality of controllable points at the second station each individual to a control point at the first station, polarized relay means at each station disposed to be pulled on the application of positive or negative impulses to said signalling circuit, transmitting relay means at each station disposed to apply a short or long, positive or negative impulse, or two impulses of opposite polarity to said signalling circuit for selectively pulling for different lengths of time said polarized relay means at both stations, receiving means at each station responsive to the operation of said polarized relay means for predetermined time intervals for selecting predetermined corresponding points at each station, switching means at each station operative following a transmitting operation thereat to switch the station to a receiving condition and operative following a receiving operation to switch to a transmitting condition, means responsive to the selection of a point at the second station for initiating the functioning of the transmitting relay means at the second station for transmitting to the first station a check impulse comprising a short or long, positive or negative impulse or two impulses of opposite polarity individual to the point selected to selectively operate the polarized relay means thereat, means including the receiving means at the first station responsive to the functioning of the polarized relay means at the first station in response to said check impulse for indicating that the proper selection has been made at the second station, means individual to each control point at the first station for initiating the functioning of the transmitting relay means at the first station for transmitting to the second station a timed operation impulse to selectively operate the polarized relay means thereat, and means including the receiver means at the second station responsive to the functioning of the polarized relay means at the second station in response to said operation impulse for effecting the operation at the selected point corresponding to the operation impulse transmitted.

18. A supervisory control system comprising, in combination, a first station, a second station, a single signalling circuit connecting the stations, a plurality of control points at the first station, a plurality of controllable points at the second station each individual to a control point at the first station, a point selection relay individual to each point at each station, and control means at each station including positive and negative transmitting relays responsive to an operation at either station for transmitting to the other station a single selection impulse of positive or negative polarity, short or long duration or a direct-current impulse of one polarity followed immediately by a direct-current impulse of opposite polarity, and receiver means at each station selectively responsive to said selection impulses to selectively operate at each station a predetermined pair of corresponding point selection relays individual to the impulse transmitted.

19. In a supervisory control system, in combination, a first station, a second station, a single signalling circuit connecting the stations, a plurality of control points at the first station including a combined control and metering point, an indicating meter associated with said control and metering point, a plurality of controllable points at the second station including a combined control and metering point individual to the corresponding point at the first station, a transmitter and a receiver at each station, means including said transmitters and receivers for selecting and checking said control and metering points at each station over said signalling circuit from the control point individual thereto, a source of voltage at the second station, said indicating meter and voltage source being connected to the signalling circuit to indicate said voltage on selection and check of said combined control and metering points, potentiometer means connected across said voltage source and disposed to be operated in accordance with a gradually changing condition, means including the transmitter at the first station and receiver at the second station for connecting the potentiometer means to the signalling circuit whereby said indicating meter indicates the potentiometer voltage, means including said transmitters and receivers for initiating from the first station over said signalling line a change in said condition, said indicating meter being disposed to indicate the change in potentiometer voltage simultaneously with the change in said condition, means at the first station including the transmitter thereat for operating the receiver at the second station over said signalling line for arresting further change in said condition, said potentiometer means and said indicating meter operating over said signalling line to indicate the state of said condition at the termination of said change.

HANS P. BOSWAU.